(12) United States Patent
Inokuma et al.

(10) Patent No.: US 11,052,765 B2
(45) Date of Patent: Jul. 6, 2021

(54) CONTROL SYSTEM

(71) Applicant: DENSO CORPORATION, Kariya (JP)

(72) Inventors: Kenji Inokuma, Kariya (JP); Takuto Suzuki, Kariya (JP); Hiroshi Inamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 373 days.

(21) Appl. No.: 16/321,359

(22) PCT Filed: Jul. 12, 2017

(86) PCT No.: PCT/JP2017/025454
§ 371 (c)(1),
(2) Date: Jan. 28, 2019

(87) PCT Pub. No.: WO2018/021032
PCT Pub. Date: Feb. 1, 2018

(65) Prior Publication Data
US 2019/0160949 A1 May 30, 2019

(30) Foreign Application Priority Data

Jul. 27, 2016 (JP) .............................. JP2016-147887
Oct. 27, 2016 (JP) .............................. JP2016-211038

(51) Int. Cl.
*B60L 3/00* (2019.01)
*H02J 7/16* (2006.01)
(Continued)

(52) U.S. Cl.
CPC ........... *B60L 3/0061* (2013.01); *B60L 3/0046* (2013.01); *B60L 3/12* (2013.01); *H01M 10/44* (2013.01);
(Continued)

(58) Field of Classification Search
CPC ........ B60L 3/0061; B60L 3/0046; B60L 3/12; B60L 2240/42; H01M 10/44; H02J 7/16; Y02T 10/70; Y02T 10/7072
(Continued)

(56) References Cited

U.S. PATENT DOCUMENTS 10,011,268 B2 * 7/2018 Arcangeli ............... B60L 58/12
2009/0174254 A1 7/2009 Winter et al.
(Continued)

FOREIGN PATENT DOCUMENTS

JP 2016-195472 A 11/2016

*Primary Examiner* — Gertrude Arthur Jeanglaude
(74) *Attorney, Agent, or Firm* — Oliff PLC

(57) ABSTRACT

A first and a second control device capable of transmitting and receiving signals to and from a third control device that performs an overall management to the control devices. The third device transmits a command signal to the second device in response to a reception signal from the first device. The first device transmits, to the second device and the third device, an electrical power storage unit signal includes at least one of control information and abnormality information about charging/discharging. The second device includes a function of controlling actuation of a rotating electrical machine on the basis of an actuation command signal about actuation of the rotating electrical machine transmitted from the third device in response to the electrical power storage unit signal, and a function of controlling actuation of the rotating electrical machine on the basis of the electrical power storage unit signal transmitted from the first device.

19 Claims, 12 Drawing Sheets

(51) Int. Cl.
*B60L 3/12* (2006.01)
*H01M 10/44* (2006.01)

(52) U.S. Cl.
CPC ............ *H02J 7/16* (2013.01); *B60L 2240/42* (2013.01); *Y02T 10/70* (2013.01); *Y02T 10/7072* (2013.01)

(58) Field of Classification Search
USPC .......................................................... 701/22
See application file for complete search history.

(56) References Cited

U.S. PATENT DOCUMENTS

2011/0118924 A1* 5/2011 Nasu .................... B60L 1/02
701/22
2013/0307471 A1* 11/2013 Ichikawa ............ B60L 15/2009
320/108
2014/0265558 A1 9/2014 Katayama et al.

* cited by examiner

CONTROL SYSTEM

CROSS-REFERENCE TO RELATED APPLICATION

This application is the U.S. national phase of International Application No. PCT/JP2017/025454 filed Jul. 12, 2017 which designated the U.S. and claims priority to both Japanese Patent Application No. 2016-147887 filed on Jul. 27, 2016 and Japanese Patent Application No. 2016-211038 filed on Oct. 27, 2016, the contents of which are incorporated herein by reference.

TECHNICAL FIELD

The present disclosure relates to a control system that is applied to a power system mounted in a vehicle or the like, and more particularly to a control system includes a plurality of control devices for performing control over the power system.

BACKGROUND ART

A conventionally-known vehicle power system includes, as an example configuration, a plurality of storage batteries (e.g., a lead-acid storage battery and a lithium-ion storage battery) and a rotating electrical machine connected in parallel with each of the storage batteries. This power system is provided with a battery control device that controls charging/discharging of the lithium-ion storage battery, a rotating electrical machine control device that controls the actuation of the rotating electrical machine, and a higher-level control device that performs overall management. Signals are transmitted between the battery control device and the higher-level control device via a communication line such as a CAN bus, and signals are transmitted between the rotating electrical machine control device and the higher-level control device via a communication line. For example, PTL 1 discloses a similar system.

For example, in the event of an abnormality in charging/discharging of the lithium-ion storage battery, the abnormality is detected by the battery control device, and an abnormality signal is transmitted to the higher-level control device. On the basis of the received abnormality signal, the higher-level control device outputs, to the rotating electrical machine control device, a command signal for causing the rotating electrical machine control device to perform a fail-safe process such as reducing the power generation output from the rotating electrical machine. The rotating electrical machine control device performs the fail-safe process on the basis of the command signal received from the higher-level control device. In this manner, the higher-level control device performs overall management of the other control devices.

CITATION LIST

Patent Literature

[PTL 1] JP 2014-177213 A

SUMMARY OF THE INVENTION

However, according to the conventional technique, the higher-level control device requires the other lower-level control devices to transmit signals via the higher-level control device. Therefore, for example, if an abnormality occurs in the lithium-ion storage battery (electrical power storage unit), the initiation of the fail-safe process for dealing with the abnormality can be delayed in the rotating electrical machine. The delay in the fail-safe process may cause overcurrent or the like, leading to secondary damage.

The present disclosure has been made in view of the above problems, and the main object thereof is to provide a control system capable of causing the electrical power storage unit and the rotating electrical machine side to cooperate with each other promptly and controlling the electrical power storage unit and the rotating electrical machine properly.

Hereinafter, aspects of solving the above problems and the effects thereof will be described.

In the following description, reference signs for corresponding components in the disclosed embodiments are appropriately indicated in parentheses or the like for ease of detecting. However, the following description is not limited to specific components indicated in parentheses or the like.

According to a first aspect, a power system includes a rotating electrical machine; a first electrical power storage unit and a second electrical power storage unit connected in parallel with the rotating electrical machine; and a switch provided closer to the second electrical power storage unit on an electrical path between the first electrical power storage unit and the second electrical power storage unit than a point of connection with the rotating electrical machine is. The first aspect includes a first control device that controls charging/discharging of the second electrical power storage unit by opening/closing the switch; and a second control device that controls actuation of power generation and power running of the rotating electrical machine, the first control device and the second control device being able to transmit and receive signals to and from a third control device using a signal transmission section, the third control device being configured to perform the overall management to the control devices and transmit a command signal to the second control device in response to a reception signal from the first control device. The first control device transmits, to the second control device and the third control device, an electrical power storage unit signal includes at least one of control information and abnormality information about the charging/discharging, and the second control device includes a function of controlling actuation of the rotating electrical machine on the basis of an actuation command signal related to actuation of the rotating electrical machine transmitted from the third control device in response to the electrical power storage unit signal, and a function of controlling actuation of the rotating electrical machine on the basis of the electrical power storage unit signal transmitted from the first control device.

In the power system includes the rotating electrical machine, in which the first electrical power storage unit and the second electrical power storage unit are connected in parallel with the rotating electrical machine, and in which a switch is provided closer to the second storage battery on the electrical path between the electrical power storage units than the point of connection with the rotating electrical machine is, the rotating electrical machine and the second electrical power storage unit become connected in response to the switch being closed (turned on), and the rotating electrical machine and the second electrical power storage unit become disconnected in response to the switch being opened (turned off). In this case, the state of charging/discharging of the second storage battery can be adjusted by opening/closing the switch.

The control system includes the first control device that controls charging/discharging of the second electrical power storage unit and the second control device that controls actuation of the rotating electrical machine. Using the signal transmission section, the first control device and the second control device are able to transmit and receive signals to and from the third control device that performs the overall management to the control devices. According to the above configuration of the present aspect, the control devices can perform the following processes:

(1) The first control device transmits, to the second control device and the third control device, an electrical power storage unit signal includes at least one of control information and abnormality information about charging/discharging of the second electrical power storage unit;

(2) The third control device transmits, to the second control device, an actuation command signal about the actuation of the rotating electrical machine on the basis of the electrical power storage unit signal received from the first control device; and (3) The second control device controls the actuation of the rotating electrical machine on the basis of the actuation command signal received from the third control device, or controls the actuation of the rotating electrical machine on the basis of the electrical power storage unit signal received from the first control device.

In this case, the second control device can directly receive an electrical power storage unit signal from the first control device without the need to wait to receive an actuation command signal from the third control device, and can implement temporary measures on the basis of the electrical power storage unit signal. In other words, when some change (state change) in control information or abnormality information about charging/discharging of the second storage battery occurs in the first control device, that information can be rapidly reflected in the actuation of the rotating electrical machine. While instantaneous action can be achieved by the second control device, action with a high degree of certainty can be achieved using transmission signals from the third control device. Note that the second control device performs local computation processes to control the rotating electrical machine, whereas the third control device performs overall management of the other control devices. Therefore, transmission signals from the third control device enable the second control device to take action with a high degree of certainty (also referred to as reliability).

As a result, it is possible to cause the electrical power storage unit side and the rotating electrical machine side to cooperate with each other promptly and control the electrical power storage unit and the rotating electrical machine properly.

In the event of an abnormality in charging/discharging in the second electrical power storage unit, the switch is opened in order to stop charging/discharging the second electrical power storage unit. While the second electrical power storage unit is neither charged nor discharged, only the first electrical power storage unit is charged/discharged in the power system, and overdischarge from the rotating electrical machine toward the first electrical power storage unit may occur. Therefore, fail-safe actuation of the rotating electrical machine is performed by the second control device. For example, fail-safe actuation includes imposing a restriction on power generation by the rotating electrical machine. However, if fail-safe actuation of the rotating electrical machine does not start immediately, an excess current flows through the conduction path between the rotating electrical machine and the first electrical power storage unit, and failure (secondary damage) may occur accordingly.

In this regard, according to a second aspect:

(1) In the event of an abnormality is the charging/discharging, the first control device opens the switch, and transmits, as the electrical power storage unit signal to the second control device and the third control device, an abnormality signal includes the abnormality information corresponding to the abnormality; and (2) The second control device starts fail-safe actuation of the rotating electrical machine on the basis of reception of the abnormality signal from the first control device or reception of a fail-safe signal for performing fail-safe actuation of the rotating electrical machine transmitted as the actuation command signal from the third control device in response to the abnormality signal, whichever occurs earlier.

In this case, the rotating electrical machine can start fail-safe actuation on the basis of an abnormality signal from the first control device without the need to wait to receive a fail-safe signal from the third control device. Consequently, when an abnormality in charging/discharging occurs in the second electrical power storage unit, a disadvantageous situation where a delay in the initiation of fail-safe actuation of the rotating electrical machine causes an excess current flow through the conduction path between the rotating electrical machine and the first electrical power storage unit can be avoided, and failure due to overcurrent can be prevented.

According to a third aspect, the power system includes a first switch provided closer to the first electrical power storage unit on an electrical path between the first electrical power storage unit and the second electrical power storage unit than a point of connection with the rotating electrical machine is; a second switch provided in the second storage battery side on the electrical path; and a normally-closed bypass switch provided on a bypass for bypassing the first switch, and in the event of an abnormality in the charging/discharging, the first control device opens the first switch and the second switch, closes the bypass switch, and transmits the abnormality signal to the second control device and the third control device.

In the configuration of opening the first switch and the second switch and closing the bypass switch in the event of an abnormality in charging/discharging of the second electrical power storage unit, overcurrent may flow from the rotating electrical machine toward the first electrical power storage unit through the bypass switch after the abnormality occurs. In this case, the bypass switch may be damaged. In this regard, as described above, fail-safe actuation of the rotating electrical machine is started without the need to wait to receive a fail-safe signal from the third control device. Therefore, overcurrent can be avoided, failure due to overcurrent can be prevented, and the bypass switch can be prevented from being damaged.

After an abnormality in charging/discharging of the second electrical power storage unit occurs, the abnormality could possibly be resolved. In this regard, according to a fourth aspect:

(1) After an abnormality in the charging/discharging occurs, when the abnormality is resolved, the first control device returns the switch to normal control, and transmits, as the electrical power storage unit signal to the third control device, an abnormality clear signal includes the abnormality information corresponding to resolution of abnormality; and (2) The second control device finishes the fail-safe actuation on the basis of a fail-safe clear signal for terminating the fail-safe actuation of the rotating electrical machine transmitted as the actuation command signal from the third control device in response to the abnormality clear signal.

In this case, unlike in the case of starting fail-safe actuation in response to an abnormality, only the third control device, i.e., the higher-level control device, is authorized to determine whether to finish fail-safe actuation. Therefore, whether to finish fail-safe actuation can be determined more reliably. To be more specific, priority is given to promptness when it comes to starting fail-safe actuation, and priority is given to certainty when it comes to finishing fail-safe actuation.

The amount of charge/discharge required of the second electrical power storage unit can change. For example, the required amount of charge/discharge can change as the amount of power required by various electrical loads changes or as the second electrical power storage unit becomes deteriorated. In this case, it is desirable that the actuation state of the rotating electrical machine be controlled in accordance with the required amount of charge/discharge. In this regard, according to a fifth aspect:

(1) The first control device transmits, as the electrical power storage unit signal to the second control device and the third control device, a request signal includes the control information corresponding to an amount of charge/discharge required of the second electrical power storage unit; and (2) The second control device includes a function of controlling actuation of the rotating electrical machine on the basis of the actuation command signal transmitted from the third control device in response to the request signal, and a function of controlling actuation of the rotating electrical machine on the basis of the request signal transmitted from the first control device.

In this case, the second control device can rapidly control the actuation of the rotating electrical machine in response to a request signal from the first control device without the need to wait to receive an actuation command signal from the third control device. Consequently, when the amount of power required by various electrical loads of the power system changes or when the second electrical power storage unit becomes deteriorated, related requests can be dealt with rapidly.

According to a sixth aspect, the second control device uses different amounts of actuation of the rotating electrical machine with respect to the required amount of charge/discharge for controlling actuation of the rotating electrical machine on the basis of the actuation command signal received from the third control device and for controlling actuation of the rotating electrical machine on the basis of the request signal received from the first control device.

Priority is desirably given to certainty (reliability) when controlling the actuation of the rotating electrical machine on the basis of an actuation command signal received from the third control device, whereas priority is desirably given to promptness when controlling the actuation of the rotating electrical machine on the basis of a request signal received from the first control device. In this regard, different amounts of actuation of the rotating electrical machine with respect to the required amount of charge/discharge are used for controlling the rotating electrical machine on the basis of an actuation command signal from the third control device and for controlling the rotating electrical machine on the basis of a request signal from the first control device. Therefore, the actuation of the rotating electrical machine can be appropriately controlled in accordance with the situation of state transition.

The actuation state or abnormality state of the rotating electrical machine can change, and it is desirable that the open/closed state of the switch, that is, the connected/disconnected state of the rotating electrical machine and the second electrical power storage unit, be controlled accordingly. In this regard, according to seventh and eighth aspects, on the premise that the third control device transmits a command signal to the first control device in response to a reception signal from the second control device:

(1) The second control device transmits, to the first control device and the third control device, a rotating electrical machine signal includes at least one of control information and abnormality information about the rotating electrical machine; and (2) The first control device includes a function of controlling opening/closing of the switch on the basis of an open/close command signal about opening/closing of the switch transmitted from the third control device in response to the rotating electrical machine signal, and a function of controlling opening/closing of the switch on the basis of the rotating electrical machine signal transmitted from the second control device.

In this case, the first control device can directly receive a rotating electrical machine signal from the second control device without the need to wait to receive an open/close command signal from the third control device, and can implement temporary measures on the basis of the rotating electrical machine signal. In other words, when some change in control information or abnormality information about the rotating electrical machine occurs in the second control device, that information can be rapidly reflected in the opening/closing of the switch. As a result, as mentioned above, it is possible to cause the electrical power storage unit side and the rotating electrical machine side to cooperate with each other promptly and control the electrical power storage unit and the rotating electrical machine properly.

In the event of an abnormality in the rotating electrical machine, the switch is forcibly opened in order to stop charging/discharging the second electrical power storage unit. However, if the switch is not forcibly opened immediately after the occurrence of abnormality in the rotating electrical machine, failure may occur in the second electrical power storage unit side. For example, a ground fault in the rotating electrical machine or the inverter (switching circuit section) connected thereto may cause failure such as element damage due to overcurrent.

In this regard, according to a ninth aspect:

(1) In the event of an abnormality in the rotating electrical machine, the second control device transmits, as the rotating electrical machine signal to the first control device and the third control device, a rotating electrical machine abnormality signal corresponding to the abnormality; and (2) The first control device forcibly opens the switch on the basis of reception of the rotating electrical machine abnormality signal from the second control device or reception of a force-open signal for forcibly opening the switch transmitted as the open/close command signal from the third control device in response to the rotating electrical machine abnormality signal, whichever occurs earlier.

In this case, the switch is forcibly opened on the basis of a rotating electrical machine abnormality signal from the second control device without the need to wait to receive a force-open signal from the third control device. Consequently, when an abnormality in the rotating electrical machine occurs, the flow of overcurrent toward the second electrical power storage unit due to a delay in the force opening of the switch can be prevented, and failure due to overcurrent can be prevented.

According to a tenth aspect, the second control device determines, as the abnormality in the rotating electrical machine, that an overcurrent flows through at least one of the rotating electrical machine and a switching circuit section that passes a current through each phase of the rotating electrical machine, and determines whether there is the overcurrent when the rotating electrical machine is in a state other than a power running state.

When the rotating electrical machine is in a state (power generation or off state) other than the power running state, no current flows from the storage batteries side to the rotating electrical machine side. Therefore, whether there is an overcurrent can be accurately determined with a relatively low current threshold value. In this case, measures such as opening the switch can be implemented before any excess current flows into the rotating electrical machine or switching circuit section, so that switch elements can be properly protected.

In the configuration of providing a blocking section that blocks a conduction path in response to an overcurrent flow through at least one of the rotating electrical machine and a switching circuit section, the conduction current temporarily increases as the overcurrent flows, and then sharply decreases as soon as the path is blocked by the blocking section. Focusing on this point, according to an eleventh aspect, the second control device determines that the overcurrent flowed on the basis of results of first determination for determining that a conduction current flowing through the switching circuit section has increased to a predetermined overcurrent threshold value and second determination for determining that the conduction current has decreased after that, and transmits the rotating electrical machine abnormality signal to the first control device and the third control device on the basis of the determination.

In this case, the conduction current can be suitably interrupted while the surge current associated with the opening of the switch is suppressed. To be more specific, opening a switch on the conduction path through which an overcurrent is flowing may cause a surge current in the conduction path, leading to switch damage due to the surge current. In this regard, according to the above configuration, the switch is opened while the overcurrent is temporarily diminished. Therefore, the surge current associated with the opening of the switch is suppressed, and switch damage due to the surge current can be prevented. As a result, measures to deal with the occurrence of overcurrent can be optimized.

According to a twelfth aspect, the second control device determines, as the second determination, that the conduction current has decreased to a second threshold value smaller than the overcurrent threshold value after increasing to the overcurrent threshold value.

According to the above configuration, when a short-circuit fault occurs in the rotating electrical machine or switching circuit section, the increase in current associated with the occurrence of overcurrent and the decrease in current associated with the blocking of the path by the blocking section can be determined with certainty. Consequently, switch opening measures can be properly implemented.

The rotating electrical machine is in any of the power generation, power running, and non-actuated states, and it is desirable that the state of charging/discharging of the second storage battery be controlled in accordance with the state of the rotating electrical machine. In this regard, according to a thirteenth aspect:

(1) The second control device transmits, as the rotating electrical machine signal to the first control device and the third control device, a state signal indicating which of a plurality of states includes power generation and power running states the rotating electrical machine is in; and (2) The first control device includes a function of controlling opening/closing of the switch on the basis of an open/close command signal about opening/closing of the switch transmitted from the third control device in response to the state signal, and a function of controlling opening/closing of the switch on the basis of the state signal transmitted from the second control device.

In this case, the first control device can rapidly perform control in accordance with the state of the rotating electrical machine without the need to receive a signal indicating information on the rotating electrical machine from the third control device.

When the rotating electrical machine is in a state (power generation or non-actuated state) other than the power running state, neither the first storage battery nor the second storage battery passes any current through the rotating electrical machine. Therefore, if the rotating electrical machine is drawing a current while the rotating electrical machine is in a state other than the power running state, it can be determined that an abnormal current such as overcurrent is flowing. In this regard, according to a fourteenth aspect:

(1) The second control device transmits, as the state signal to the first control device, a non-power running signal indicating that the rotating electrical machine is in a state other than the power running state; and (2) When receiving the non-power running signal from the second control device, the first control device opens the switch on the basis of the fact that the rotating electrical machine is drawing a current.

Consequently, the first control device detects that the rotating electrical machine is in a state (power generation or non-actuated state) other than the power running state on the basis of a non-power running signal from the second control device, determines that an overcurrent is flowing if the rotating electrical machine is drawing a current in this state, and opens the switch. In this case, the first control device can rapidly detect the state of overcurrent abnormality, so that switch elements can be properly protected. For example, whether there is an overcurrent can be accurately determined with a relatively low current threshold value, and measures such as opening the switch can be implemented before any excess current flows into the rotating electrical machine or switching circuit section.

Note that the above configuration may further include transmitting, by the second control device to the third control device, a signal indicating a flow of overcurrent into the rotating electrical machine in response to detecting the flow, and outputting, by the third control device to the first control device, a force-open signal for the switch. However, according to the above twelfth aspect, a fail-safe process can be rapidly performed without the need to wait for a force-open signal from the third control device.

According to a fifteenth aspect, the first control device acquires detection information of voltage or current detected on a conduction path through the second electrical power storage unit, the second control device acquires detection information of voltage or current detected on a conduction path through the rotating electrical machine, and one of the first control device and the second control device receives the detection information from the other control device via the signal transmission section, and evaluates reliability of the detection information on the basis of the detection information in each control device.

Since the second electrical power storage unit and the rotating electrical machine exchange power with each other, their voltages and currents have correlated values. In this regard, if the first control device and the second control device can deliver information on detection voltage and detection current to each other, an improvement in the accuracy and reliability of detection voltage and detection current can be expected. Therefore, the first control device and the second control device respectively acquire detection information of voltage or current detected on the conduction path through the second electrical power storage unit and detection information of voltage or current detected on the conduction path through the rotating electrical machine. Then, one of the first control device and the second control device receives the detection information from the other control device via the signal transmission section, and evaluates the reliability of the detection information on the basis of the detection information in each control device. In this case, the reliability of detection information, that is, the reliability of voltage sensors or current sensors, can be suitably evaluated using the difference between items of detection information acquired in the control devices.

According to a sixteenth aspect, the first electrical power storage unit is a lead-acid storage battery, and the second electrical power storage unit is a high-density storage battery having a higher output density and a higher energy density than the lead-acid storage battery.

In a case where the first electrical power storage unit is a lead-acid storage battery and the second electrical power storage unit is a high-density storage battery such as a lithium-ion storage battery, the amount of electrical power storage unit and temperature of the second electrical power storage unit need to be properly managed so that its efficiency and durability can be enhanced. In this regard, according to each of the above configurations, the amount of electrical power storage unit and temperature of the second electrical power storage unit can be properly managed.

According to a seventeenth aspect, the signal transmission section that enables signal transmission between the first and second control devices and the third control device is a communication line that establishes a communication network, and the signal transmission section that enables signal transmission between the first control device and the second control device is a hard wire that transmits a voltage signal from an output port of an output side control device to an input port of an input side control device.

The first and second control devices and the third control device are connected together by the communication line such as CAN, and the first control device and the second control device are connected together by hardwiring, whereby signal transmission between the first control device and the second control device is enabled without waiting for a communication period in each control device. Consequently, information can be transmitted more promptly.

The control system may include not only the first control device and the second control device but also the third control device that is a higher-level control device (eighteenth and nineteenth aspects).

In this case, according to the eighteenth aspect, a power system includes a rotating electrical machine; a first electrical power storage unit and a second electrical power storage unit connected in parallel with the rotating electrical machine; and a switch provided closer to the second electrical power storage unit on an electrical path between the first electrical power storage unit and the second electrical power storage unit than a point of connection with the rotating electrical machine is. The eighteenth aspect includes a first control device that controls charging/discharging of the second electrical power storage unit by opening/closing the switch; a second control device that controls actuation of power generation and power running of the rotating electrical machine; and a third control device that performs the overall management to the first control device and the second control device, the first control device, the second control device, and the third control device being able to transmit signals to each other using a signal transmission section. The first control device transmits, to the second control device and the third control device, an electrical power storage unit signal includes at least one of control information and abnormality information about the charging/discharging, the third control device transmits, to the second control device, an actuation command signal about actuation of the rotating electrical machine on the basis of the electrical power storage unit signal received from the first control device, and the second control device includes a function of controlling actuation of the rotating electrical machine on the basis of the actuation command signal received from the third control device, and a function of controlling actuation of the rotating electrical machine on the basis of the electrical power storage unit signal received from the first control device.

According to the nineteenth aspect, a power system includes a rotating electrical machine; a first electrical power storage unit and a second electrical power storage unit connected in parallel with the rotating electrical machine; and a switch provided closer to the second electrical power storage unit on an electrical path between the first electrical power storage unit and the second electrical power storage unit than a point of connection with the rotating electrical machine is. The nineteenth aspect includes a first control device that controls charging/discharging of the second electrical power storage unit by opening/closing the switch; a second control device that controls actuation of power generation and power running of the rotating electrical machine; and a third control device that performs the overall management to the first control device and the second control device, the first control device, the second control device, and the third control device being able to transmit signals to each other using a signal transmission section. The second control device transmits, to the first control device and the third control device, a rotating electrical machine signal includes at least one of control information and abnormality information about the rotating electrical machine, the third control device transmits, to the first control device, an open/close command signal about opening/closing of the switch on the basis of the rotating electrical machine signal received from the second control device, and the first control device includes a function of controlling opening/closing of the switch on the basis of the open/close command signal received from the third control device, and a function of controlling opening/closing of the switch on the basis of the rotating electrical machine signal received from the second control device.

BRIEF DESCRIPTION OF DRAWINGS

The above and other objects, characteristics, and advantages of the present disclosure will be further clarified in the following detailed description with reference to the accompanying drawings, in which.

DESCRIPTION OF EMBODIMENTS

First Embodiment

Hereinafter, embodiments of the present disclosure will be described on the basis of the drawings. The present embodiment embodies an in-vehicle power system that supplies power to various instruments of a vehicle that travels using an engine (internal combustion engine) as a drive source.

Figure 1:
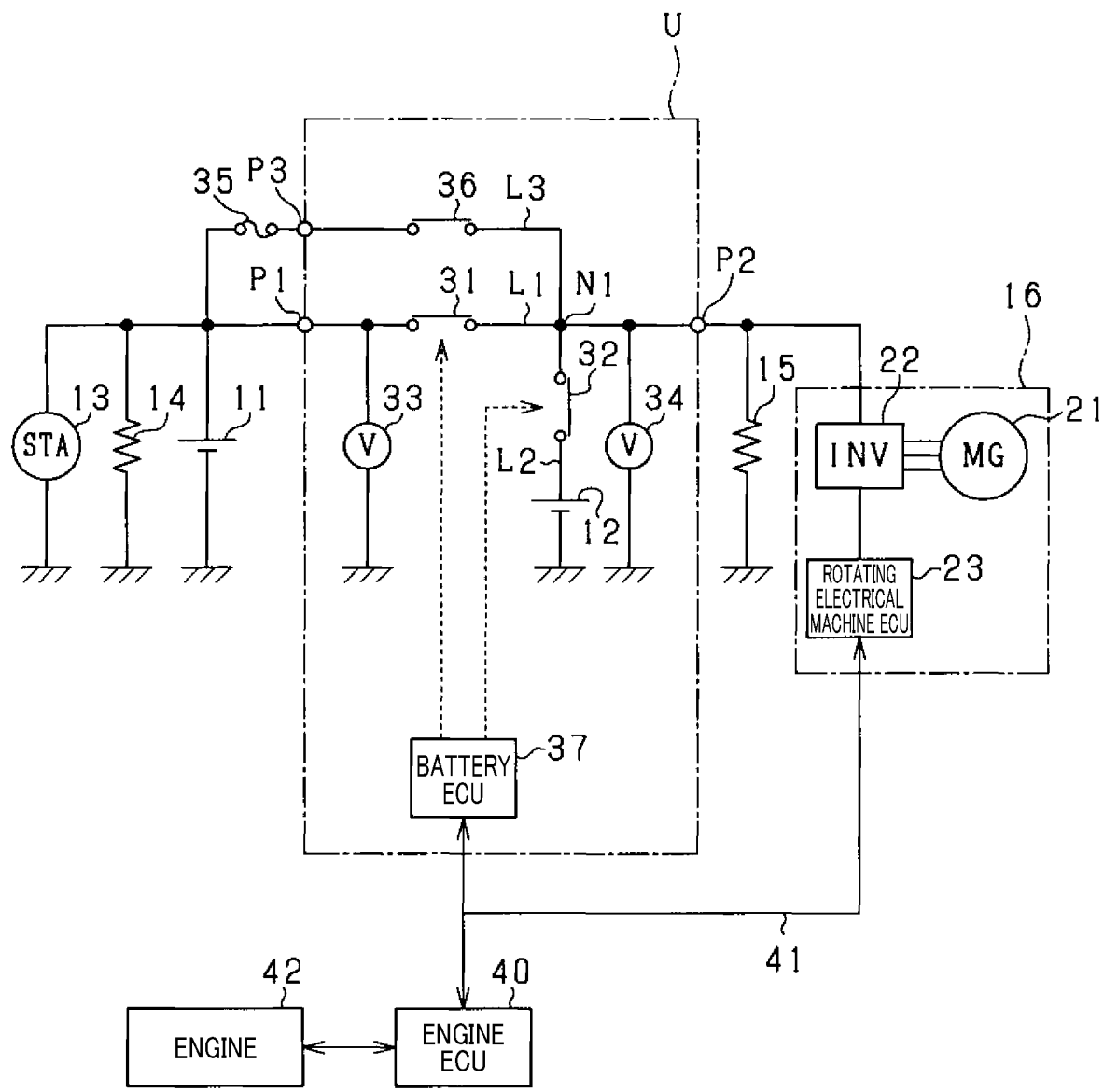
FIG. 1 is an electrical circuit diagram illustrating a power system according to the first embodiment.

As illustrated in FIG. 1, the power system is a dual power system having a lead-acid storage battery 11 as a first electrical power storage unit and a lithium-ion storage battery 12 as a second electrical power storage unit. Each of the storage batteries 11 and 12 can supply power to a starter 13, various electrical loads 14 and 15, and a rotating electrical machine unit 16. Each of the storage batteries 11 and 12 can also be charged by the rotating electrical machine unit 16. In this system, the lead-acid storage battery 11 and the lithium-ion storage battery 12 are connected in parallel with the rotating electrical machine unit 16, and the lead-acid storage battery 11 and the lithium-ion storage battery 12 are connected in parallel with the electrical loads 14 and 15.

The lead-acid storage battery 11 is a well-known general-purpose storage battery. In contrast, the lithium-ion storage battery 12 is a high-density storage battery having a higher output density and a higher energy density than the lead-acid storage battery 11, and has a lower power loss than the lead-acid storage battery 11 while being charged/discharged. The lithium-ion storage battery 12 is preferably a storage battery that achieves a higher energy efficiency than the lead-acid storage battery 11 when being charged/discharged. The lithium-ion storage battery 12 is configured as an assembled battery having a plurality of cells. These storage batteries 11 and 12 have the same rated voltage, e.g., 12 V.

Although not specifically illustrated, the lithium-ion storage battery 12 is housed in a housing case and configured as a battery unit U includes a substrate integrated therewith. The battery unit U has two output terminals P1 and P2. The lead-acid storage battery 11, the starter 13, and the electrical load 14 are connected to the output terminal P1, and the electrical load 15 and the rotating electrical machine unit 16 are connected to the output terminal P2.

The electrical loads 14 and 15 require different supply power voltages from the storage batteries 11 and 12. The electrical load 14 includes a constant voltage required load that requires a stable supply power voltage that is constant or at least fluctuates only within a predetermined range. In contrast, the electrical load 15 is a general electrical load other than the constant voltage required load. The electrical load 14 can also be referred to as a protected load. The electrical load 14 can also be referred to as a load that does not tolerate power supply failure, whereas the electrical load 15 can also be referred to as a load that tolerates power supply failure to a greater extent than the electrical load 14.

Specific examples of the electrical load 14, or the constant voltage required load, include a navigation device, an audio device, a meter device, various ECUs such as an engine ECU. In this case, fluctuations in supply power voltage can be moderated, whereby each of the above devices is prevented from being unnecessarily reset, and stable operation is enabled. Other examples of the electrical load 14 may include traveling-related actuators such as a power steering device and a brake device. Specific examples of the electrical load 15 include a seat heater, a defroster heater for the rear window, headlamps, wipers for the front window, a blast fan for an air-conditioning device, and the like.

The rotating electrical machine unit 16 includes a rotating electrical machine 21 as a three-phase AC motor, an inverter 22 as a power conversion device, and a rotating electrical machine ECU 23 that controls the actuation of the rotating electrical machine 21. The rotating electrical machine unit 16 is a power generator having a motor function, and configured as an integrated starter generator (ISG) includes both mechanical and electrical functions.

Figure 2:
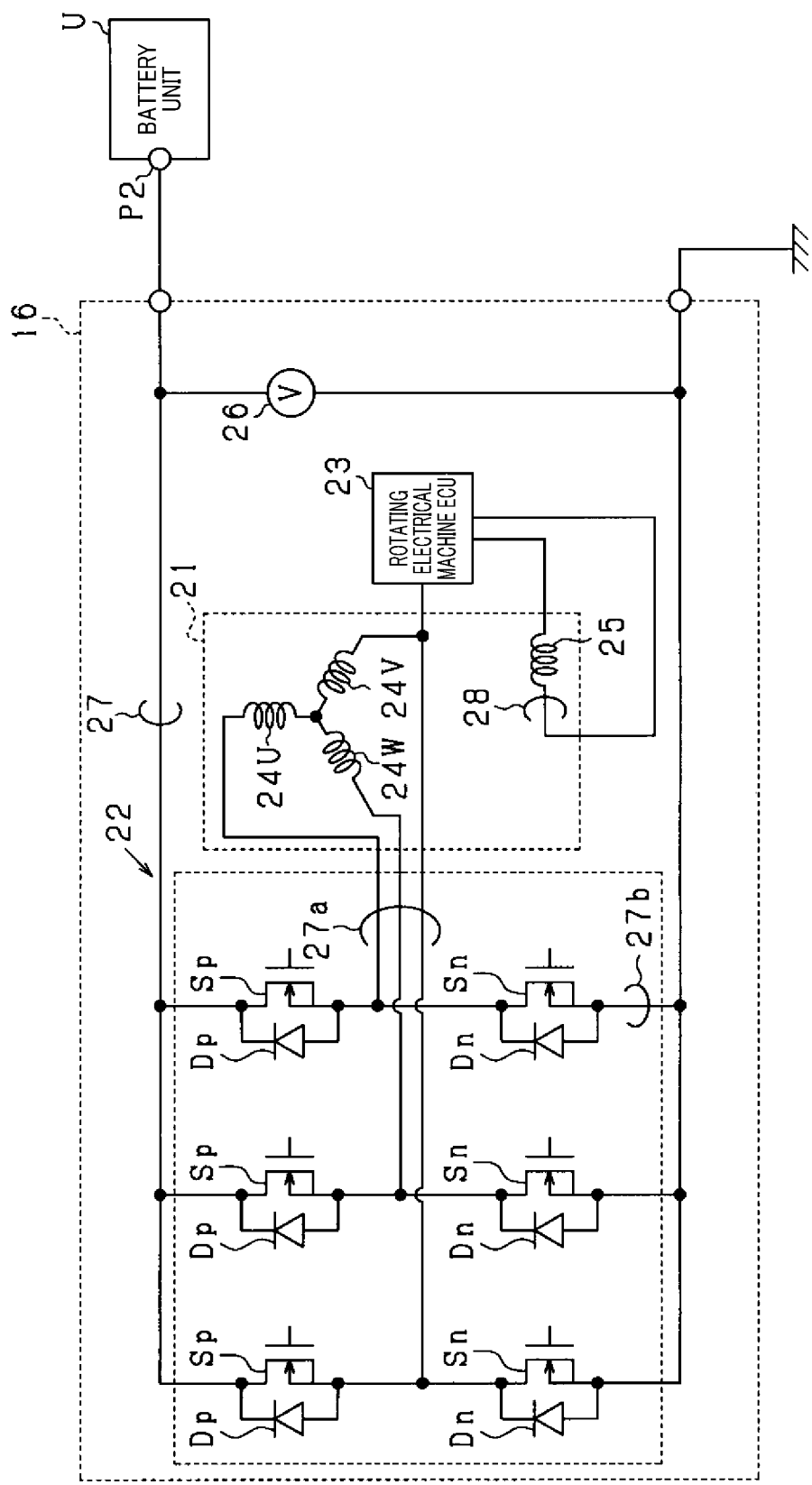
FIG. 2 is a circuit diagram illustrating an electrical configuration of a rotating electrical machine unit.

An electrical configuration of the rotating electrical machine unit 16 will be described using FIG. 2. The rotating electrical machine 21 includes U-phase, V-phase, and W-phase windings 24U, 24V, and 24W as three-phase armature windings, and includes a field winding 25. The rotating shaft of the rotating electrical machine 21 is coupled to an engine output shaft (not illustrated) by a belt in a drivable manner, so that the rotating shaft of the rotating electrical machine 21 rotates as the engine output shaft rotates, and the engine output shaft rotates as the rotating shaft of the rotating electrical machine 21 rotates. In other words, the rotating electrical machine unit 16 includes the function of power generation for generating power (regenerative power) using the rotation of the engine output shaft and axles and the function of power running by applying rotational force to the engine output shaft.

The inverter 22 converts AC voltage output from each of the phase windings 24U, 24V, and 24W into DC voltage, and outputs it to the battery unit U. The inverter 22 also converts DC voltage input from the battery unit U into AC voltage, and outputs it to each of the phase windings 24U, 24V, and 24W. The inverter 22 is a bridge circuit having upper and lower arms. The number of upper and lower arms is equal to the number of phases of the phase windings. The inverter 22 constitutes a three-phase full-wave rectifier circuit. The inverter 22 also constitutes a drive circuit for driving the rotating electrical machine 21 by adjusting power to be supplied to the rotating electrical machine 21.

The inverter 22 includes an upper arm switch Sp and a lower arm switch Sn for each phase so as to pass a current through each phase by turning on/off the corresponding switches Sp and Sn.

The inverter 22 corresponds to a switching circuit section. In the present embodiment, voltage-controlled semiconductor switching elements, more particularly N-channel MOSFETs, are used as the switches Sp and Sn. An upper arm diode Dp is connected in inverse parallel with each upper arm switch Sp, and a lower arm diode Dn is connected in inverse parallel with each lower arm switch Sn. In the present embodiment, the body diodes of the switches Sp and Sn are used as the diodes Dp and Dn. Note that the diodes Dp and Dn are not necessarily body diodes, but may be diodes independent of the switches Sp and Sn.

The middle connection point of each of the series-connected switches Sp and Sn is connected to an end of the corresponding phase winding 24U, 24V, or 24W. A voltage sensor 26 that detects input and output voltages of the inverter 22 is provided between the high-pressure side path and low-pressure side path of the inverter 22. In addition, the rotating electrical machine unit 16 is provided with, for example, a current sensor 27 that detects current flowing through the conduction path through the inverter 22 and a current sensor 28 that detects current flowing to the field winding 25. Note that the current sensor 27 may be provided between the inverter 22 and each of the phase windings 24U, 24V, and 24W (reference sign 27a in the drawing) or between the lower arm switch Sn and the ground line for each phase (reference sign 27b in the drawing). Detection signals from the sensors 26 to 28 are sequentially input to the rotating electrical machine ECU 23. The rotating electrical machine 21 is provided with a rotational angle sensor (not illustrated) for detecting angle information of the rotor, and the inverter 22 is provided with a signal processing circuit (not illustrated) for processing signals from the rotational angle sensor.

The rotating electrical machine ECU 23 includes a microcomputer includes a CPU, a ROM, a RAM, an input/output interface, and the like. The rotating electrical machine ECU 23 adjusts the excitation current through the field winding 25 with the inside IC regulator (not illustrated). Consequently, the power generation voltage of the rotating electrical machine unit 16 (output voltage to the battery unit U) is controlled. The rotating electrical machine ECU 23 also controls the inverter 22 after the vehicle starts traveling to drive the rotating electrical machine 21, thereby assisting the engine's drive force. The rotating electrical machine 21 is capable of applying an initial rotation to the crankshaft at the time of engine starting, and thus functions as an engine starting device. Note that the lead-acid storage battery 11 is preferably connected to the rotating electrical machine ECU 23 in FIG. 1.

Next, an electrical configuration of the battery unit U will be described. As illustrated in FIG. 1, the battery unit U includes, as in-unit electrical paths, an electrical path L1 connecting the output terminals P1 and P2 together and an electrical path L2 connecting a point N1 on the electrical path L1 and the lithium-ion storage battery 12 together. A switch 31 is provided on the electrical path L1, and a switch 32 is provided on the electrical path L2. In terms of the electrical path connecting the lead-acid storage battery 11 and the lithium-ion storage battery 12 together, the switch 31 is provided closer to the lead-acid storage battery 11 than the point N1 of connection with the rotating electrical machine unit 16 is, and the switch 32 is provided closer to the lithium-ion storage battery 12 than the point N1 of connection is. The switch 31 corresponds to a "first switch", and the switch 32 corresponds to a "second switch".

Each of these switches 31 and 32 includes (2×n) MOSFETs (semiconductor switching elements), for example, and a pair of MOSFETs are connected in series such that their parasitic diodes face in opposite directions. Once each of the switches 31 and 32 is turned off, the parasitic diodes completely interrupt the current to the path provided with the switch. Note that IGBTs, bipolar transistors, or the like can be used as the switches 31 and 32, instead of MOSFETs.

On the electrical path L1, a voltage sensor 33 is provided closer to P1 than the switch 31 is, and a voltage sensor 34 is provided closer to P2 than the switch 31 is. The terminal voltage of the output terminal P1 is detected by the voltage sensor 33, and the terminal voltage of the output terminal P2 is detected by the voltage sensor 34.

A bypass L3 for bypassing the switch 31 is provided in the battery unit U. The bypass L3 connects an output terminal P3 and the point N1 on the electrical path L1 together. The output terminal P3 is connected to the lead-acid storage battery 11 via a fuse 35. The bypass L3 enables connection between the lead-acid storage battery 11, the electrical load 15, and the rotating electrical machine unit 16 without the switch 31. On the bypass L3, for example, a bypass switch 36 includes a normally-closed mechanical relay is provided. As long as the bypass switch 36 is on (closed), the lead-acid storage battery 11, the electrical load 15, and the rotating electrical machine unit 16 are kept electrically connected to each other even while the switch 31 is off (open).

The battery unit U includes a battery ECU 37 for performing on/off (opening/closing) control on each of the switches 31 and 32. The battery ECU 37 includes a microcomputer includes a CPU, a ROM, a RAM, an input/output interface, and the like. The battery ECU 37 performs on/off control on each of the switches 31 and 32 on the basis of the electrical power storage unit state of each of the storage batteries 11 and 12 and command values from an engine ECU 40 that is a higher-level control device. Consequently, the lead-acid storage battery 11 and the lithium-ion storage battery 12 are selectively used for charging/discharging. For example, the battery ECU 37 calculates the state of charge (SOC), i.e., remaining capacity, of the lithium-ion storage battery 12, and controls the amount of charge and the amount of discharge for the lithium-ion storage battery 12 such that the SOC is kept within a predetermined range of use.

The engine ECU 40 is connected to the rotating electrical machine ECU 23 of the rotating electrical machine unit 16 and the battery ECU 37 of the battery unit U. The engine ECU 40 is a higher-level control device for overall management of the ECUs 23 and 37. The engine ECU 40 includes a microcomputer includes a CPU, a ROM, a RAM, an input/output interface, and the like, and controls the operation of an engine 42 on the basis of the current operation state of the engine and the current traveling state of the vehicle.

These ECUs 23, 37, and 40 are connected together by a communication line 41 that establishes a communication network such as CAN, and are capable of communicating with each other. Bidirectional communication is performed at predetermined intervals. Consequently, the ECUs 23, 37, and 40 can share various data stored therein with each other. Note that the battery ECU 37 corresponds to a "first control device", the inverter 22 and the rotating electrical machine ECU 23 correspond to a "second control device", and the engine ECU 40 corresponds to a "third control device". The communication line 41 corresponds to a "signal transmission section".

In the battery unit U, off failure (always-open failure) may occur in each of the switches 31 and 32. In this regard, the battery ECU 37 determines whether there is an off failure in each of the switches 31 and 32, and outputs off signals to the switches 31 and 32 so as to prohibit the use (i.e., charging/discharging) of the lithium-ion storage battery 12 in the event of an off failure. When the switches 31 and 32 are tuned off, an open command for the bypass switch 36 is stopped, and the bypass switch 36 shifts to the closed state accordingly. In this state, the lead-acid storage battery 11 side is connected to the rotating electrical machine unit 16 via the bypass L3. At this time, the switch 32 is turned off, whereby the lithium-ion storage battery 12 and the rotating electrical machine unit 16 become disconnected.

In addition, in the battery unit U, the lithium-ion storage battery 12 may have an abnormally high temperature. In this regard, the battery ECU 37 determines whether the lithium-ion storage battery 12 has an abnormally high temperature using a temperature sensor or the like provided in the unit, and outputs off signals to the switches 31 and 32 so as to prohibit the use of the lithium-ion storage battery 12 in the event of an abnormally high temperature fault. In this case, similarly, the bypass switch 36 shifts to the closed state, and the lead-acid storage battery 11 side is connected to the rotating electrical machine unit 16 via the bypass L3.

In the event of an abnormality such as switch-off failure and abnormally high temperature, the battery ECU 37 transmits an abnormality signal indicating the occurrence of abnormality to the other ECUs, i.e., the rotating electrical machine ECU 23 and the engine ECU 40, via the communication line 41.

The engine ECU 40 then transmits a fail-safe signal for performing fail-safe actuation of the rotating electrical machine 21 to the rotating electrical machine ECU 23 on the basis of the abnormality signal received from the battery ECU 37. In this case, the rotating electrical machine unit 16 imposes an output restriction on power generation by the rotating electrical machine 21 as a fail-safe process for dealing with the abnormality in the battery unit U. Specifically, the excitation current through the field winding 25 of the rotating electrical machine 21 is adjusted, whereby the power generation voltage of the rotating electrical machine unit 16 (output voltage to the battery unit U) is restricted. Imposing an output restriction on the rotating electrical machine 21 can be reducing generated power to zero. An output restriction on the rotating electrical machine 21 can also be imposed by adjusting the current through each phase winding.

If power generation by the rotating electrical machine 21 remains unrestricted while the switches 31 and 32 of the battery unit U are off and the bypass switch 36 is on, a current (overcurrent) larger than the allowable values in the bypass L3 and the bypass switch 36 can flow through the bypass L3. Specifically, while the lithium-ion storage battery 12 is neither charged nor discharged, only the lead-acid storage battery 11 is charged/discharged in the power system, and overdischarge from the rotating electrical machine 21 toward the lead-acid storage battery 11 may occur. The flow of overcurrent through the bypass L3 and the like may damage the bypass switch 36, and the vehicle may no longer be able to continue its evacuation traveling in a desired manner.

In this regard, by imposing an output restriction on the rotating electrical machine 21 as a fail-safe process, the magnitude of current through the bypass L3 is restricted. Therefore, the bypass L3 and the bypass switch 36 can be protected, and the vehicle can continue its evacuation traveling in a desired manner.

However, in the conventional system, in the event of an abnormality in the battery unit U, the occurrence of abnormality is determined by the battery ECU 37, an abnormality signal is transmitted to the engine ECU 40 via the communication line 41, and a fail-safe signal corresponding to the abnormality signal is transmitted from the engine ECU 40 to the rotating electrical machine ECU 23 via the communication line 41. In this case, the fail-safe process in the rotating electrical machine unit 16 subsequent to the occurrence of abnormality is performed only after communication from the battery ECU 37 to the engine ECU 40 and communication from the engine ECU 40 to the rotating electrical machine ECU 23. Therefore, the fail-safe process does not start immediately, which may lead to secondary failure. Taking into account discrete communication between the ECUs, a long period of time may be required before the fail-safe process can be performed.

In this regard, the present embodiment is based on the premise that the ECUs 23, 37, and 40 can communicate with each other through the communication line 41, and employs the following characteristic configurations:

(1) The battery ECU 37 opens the switches 31 and 32 in the event of an abnormality in the battery unit U (in other words, in the event of an abnormality in charging/discharging of the lithium-ion storage battery 12), and transmits, to the rotating electrical machine ECU 23 and the engine ECU 40, an abnormality signal (corresponding to an electrical power storage unit signal) includes abnormality information corresponding to the abnormality.

(2) On the basis of the abnormality signal received from the battery ECU 37, the engine ECU 40 transmits, to the rotating electrical machine ECU 23, a fail-safe signal (corresponding to an actuation command signal) for performing fail-safe actuation of the rotating electrical machine 21.

(3) The rotating electrical machine ECU 23 starts fail-safe actuation of the rotating electrical machine 21 on the basis of reception of the abnormality signal from the battery ECU 37 or reception of the fail-safe signal from the engine ECU 40, whichever occurs earlier.

After an abnormality occurs in the battery unit U, that abnormality could possibly be resolved. For example, an abnormally high temperature fault in the lithium-ion storage battery 12 can be resolved. In such a case, the following configurations are employed:

(4) After an abnormality occurs in the battery unit U, when the abnormality is resolved, the battery ECU 37 returns the switches 31 and 32 to normal control, and transmits, to the engine ECU 40, an abnormality clear signal (corresponding to an electrical power storage unit signal) includes abnormality information corresponding to the resolution of abnormality.

(5) On the basis of the abnormality clear signal received from the battery ECU 37, the engine ECU 40 transmits, to the rotating electrical machine ECU 23, a fail-safe clear signal (corresponding to an actuation command signal) for terminating the fail-safe actuation of the rotating electrical machine 21.

(6) On the basis of the fail-safe clear signal received from the engine ECU 40, the rotating electrical machine ECU 23 finishes the fail-safe actuation of the rotating electrical machine 21.

Next, computation processes that are performed by the ECUs 23, 37, and 40 will be described in detail using flowcharts and the like.

Figure 3:
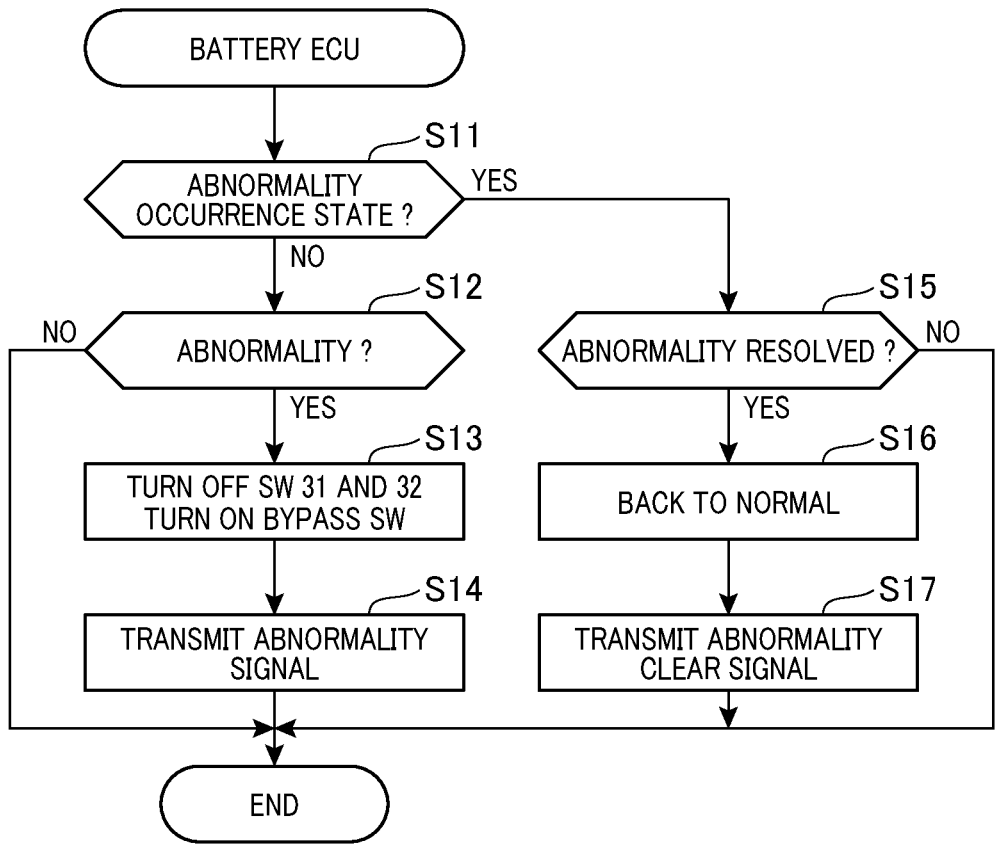
FIG. 3 is a flowchart illustrating a procedure for abnormality determination by a battery ECU.

FIG. 3 is a flowchart illustrating a procedure for abnormality determination in the battery unit U. This process is repeatedly performed by the battery ECU 37 at predetermined intervals.

In step S11 of FIG. 3, it is determined whether the occurrence of abnormality in the battery unit U has already been determined. If NO, the process goes on to step S12. If YES, the process goes on to step S15. In step S12, it is determined whether there is an abnormality in the battery unit U. Specifically, it is determined whether an off failure has occurred in the switch 31 or 32 or whether an abnormally high temperature fault has occurred in the lithium-ion storage battery 12. If there is no abnormality, the process is temporarily finished accordingly. If there is any abnormality, the process goes on to the next step S13.

In step S13, a command for turning off the switches 31 and 32 and a command for turning on the bypass switch 36 are issued. Consequently, the use of the lithium-ion storage battery 12 is prohibited, and the lead-acid storage battery 11 and the rotating electrical machine unit 16 are connected together via the bypass L3. After that, in step S14, an abnormality signal is transmitted to the rotating electrical machine ECU 23 and the engine ECU 40 using the communication line 41.

In step S15, it is determined whether the abnormal state of the battery unit U has been resolved. For example, YES is selected in step S15 if a temporary off failure has occurred in the switch 31 or 32 or if an abnormally high temperature fault in the lithium-ion storage battery 12 has been resolved. Once YES is selected in step S15, the process goes on to step S16, and the switches 31 and 32 are brought back to normal. At this time, the switches 31 and 32 are put into states that depend on the current state of the vehicle, and the bypass switch 36 is put into the open state. After that, in step S17, an abnormality clear signal is transmitted to the engine ECU 40 using the communication line 41.

Figure 4:
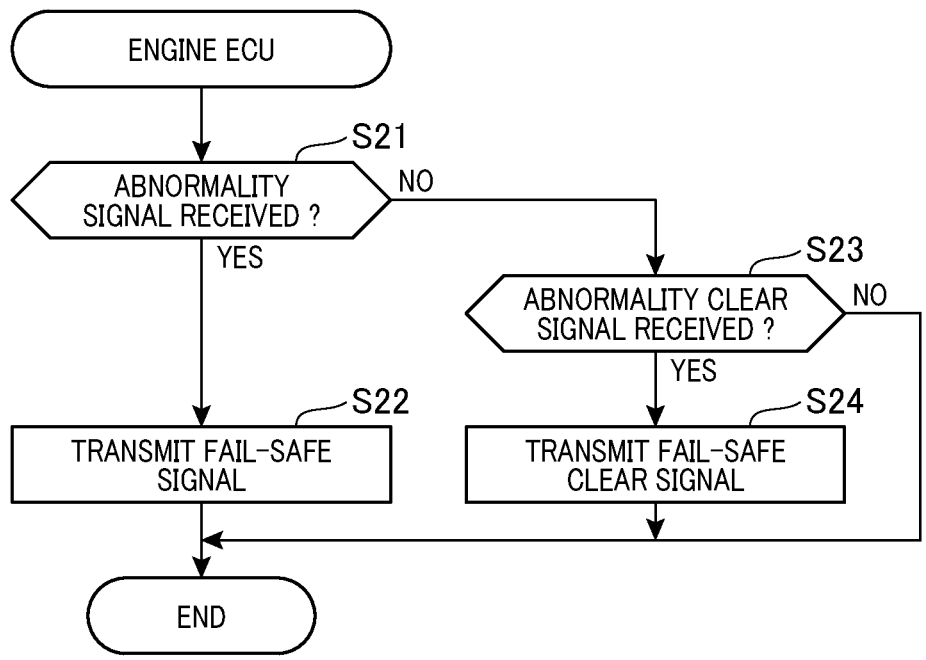
FIG. 4 is a flowchart illustrating a procedure for abnormality monitoring by an engine ECU.

FIG. 4 is a flowchart illustrating a procedure for abnormality monitoring. This process is repeatedly performed by the engine ECU 40 at predetermined intervals.

In step S21 of FIG. 4, it is determined whether an abnormality signal has been received from the battery ECU 37. If an abnormality signal has been received, the process goes on to step S22, and a fail-safe signal is transmitted to the rotating electrical machine ECU 23 using the communication line 41.

If NO is selected in step S21, the process goes on to step S23, and it is determined whether an abnormality clear signal has been received from the battery ECU 37. If an abnormality clear signal has been received, the process goes on to step S24, and a fail-safe clear signal is transmitted to the rotating electrical machine ECU 23 using the communication line 41.

Figure 5:
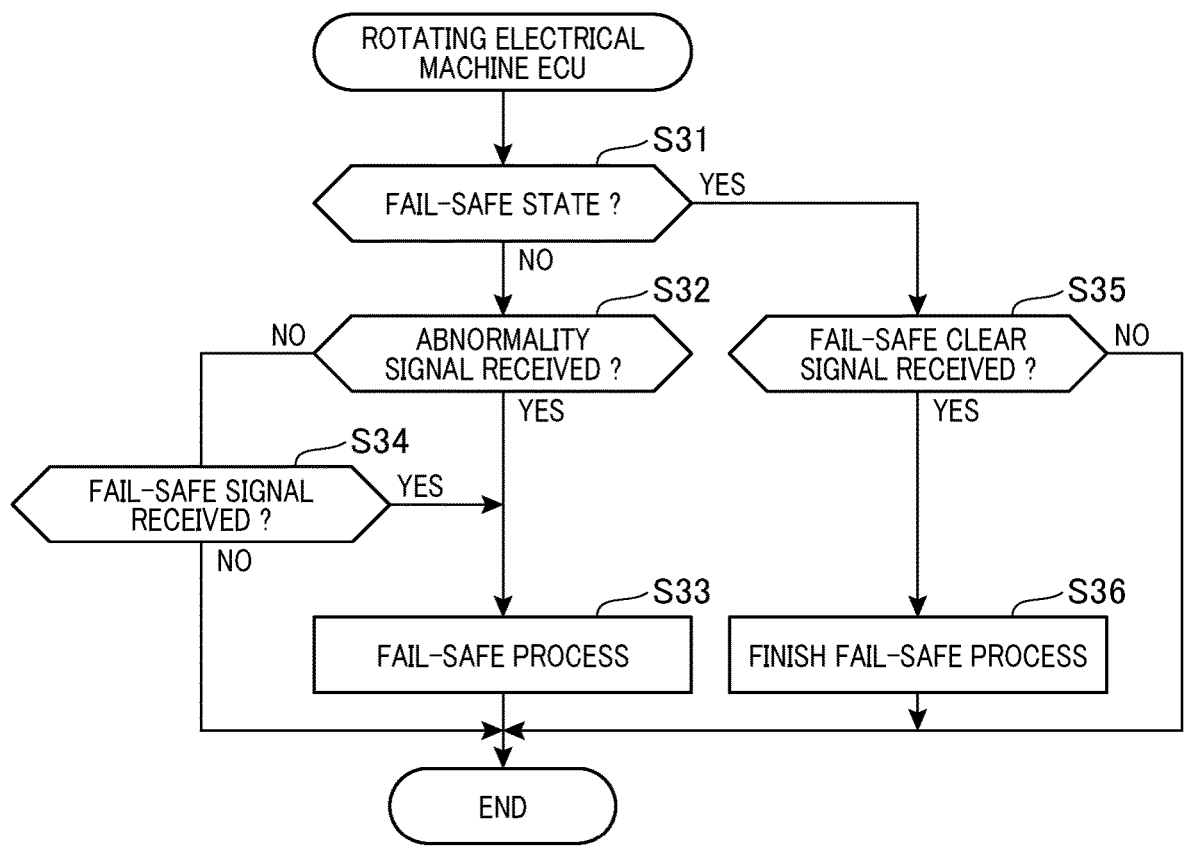
FIG. 5 is a flowchart illustrating a procedure for fail-safe control by a rotating electrical machine ECU.

FIG. 5 is a flowchart illustrating a procedure for fail-safe control in the rotating electrical machine unit 16. This process is repeatedly performed by the rotating electrical machine ECU 23 at predetermined intervals.

In step S31 of FIG. 5, it is determined whether a fail-safe process is now being performed in the rotating electrical machine unit 16. If NO, the process goes on to step S32. If YES, the process goes on to step S35. In step S32, it is determined whether an abnormality signal has been received from the battery ECU 37. If an abnormality signal has been received, the process goes on to step S33, and an output restriction on the rotating electrical machine 21 is imposed as a fail-safe process by adjusting the field current. An output restriction on the rotating electrical machine 21 as a fail-safe process can also be imposed by adjusting the current through each phase winding.

If an abnormality signal has not been received, the process goes on to step S34, and it is determined whether a fail-safe signal has been received from the engine ECU 40. If a fail-safe signal has been received, the process goes on to step S33, and the fail-safe process is performed. In this case, according to steps S32 to S34, the fail-safe process is performed on the basis of an abnormality signal from the battery ECU 37 and a fail-safe signal from the engine ECU 40, whichever comes earlier. Note that if the rotating electrical machine unit 16 is not in the fail-safe state and if neither an abnormality signal nor a fail-safe signal has been received, the rotating electrical machine ECU 23 continues the normal process without performing the fail-safe process.

In step S35, it is determined whether a fail-safe clear signal has been received from the engine ECU 40. If a fail-safe clear signal has been received, the process goes on to step S36, and the currently performed fail-safe process is finished. Consequently, the output restriction on the rotating electrical machine 21 is removed.

Next, a series of processes for dealing with an abnormality in the battery unit U will be described using the timing chart of FIG. 6.

Figure 6:
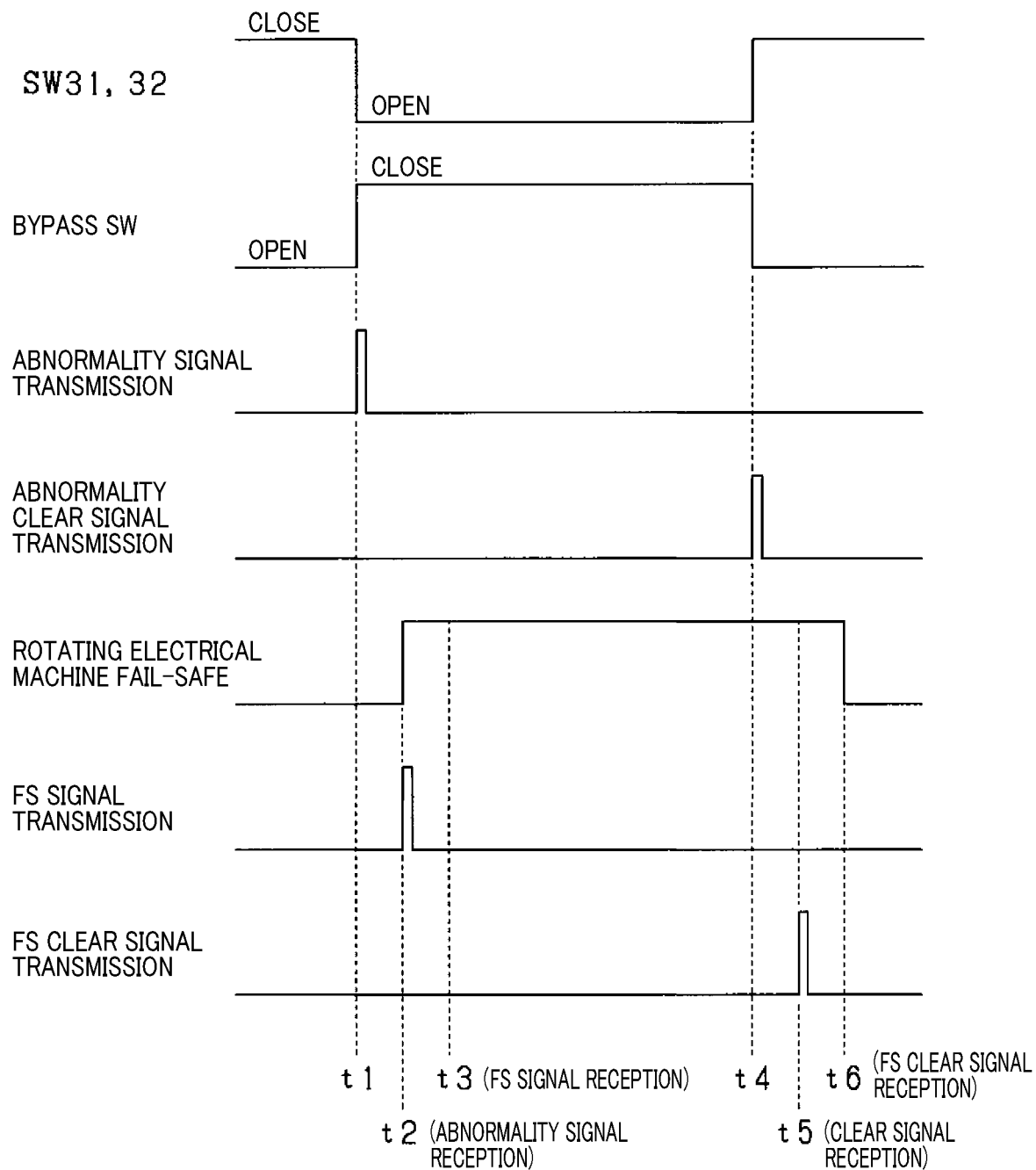
FIG. 6 is a timing chart for explaining a series of processes for dealing with an abnormality in a battery unit.

In FIG. 6, there is no abnormality in the battery unit U before timing t1. The switches 31 and 32 are closed (or either of them is open, depending on the situation), and the bypass switch 36 is open. Then, once the occurrence of abnormality in the battery unit U is determined at timing t1, the switches 31 and 32 shift to the open state, and the bypass switch 36 shifts to the closed state, accordingly. In addition, an abnormality signal is output from the battery ECU 37.

After that, at timing t2, the rotating electrical machine ECU 23 recognizes the occurrence of abnormality in the battery unit U in response to receiving the abnormality signal, and performs a fail-safe process, that is, imposes an output restriction on the rotating electrical machine 21, accordingly. Meanwhile, at timing t2 (or before/after timing t2, depending on the situation), the engine ECU 40 recognizes the occurrence of abnormality in the battery unit U in response to receiving the abnormality signal, and transmits a fail-safe signal to the rotating electrical machine ECU 23 accordingly.

After that, at timing t3, the rotating electrical machine ECU 23 receives the fail-safe signal. In this case, the fail-safe process has already been started since timing t2 on the basis of the abnormality signal from the battery ECU 37. Therefore, the fail-safe actuation of the rotating electrical machine 21 is continued.

After that, once the abnormality in the battery unit U is resolved at timing t4, the switches 31 and 32 and the bypass switch 36 are accordingly brought back to the normal state and the open state, respectively. In addition, an abnormality clear signal is output from the battery ECU 37.

After that, at timing t5, the engine ECU 40 recognizes the resolution of abnormality in the battery unit U in response to receiving the abnormality clear signal, and transmits a fail-safe clear signal to the rotating electrical machine ECU 23 accordingly.

After that, at timing t6, the rotating electrical machine ECU 23 receives the fail-safe clear signal. Then, the fail-safe actuation of the rotating electrical machine 21 is finished.

According to the present embodiment described in detail above, the following advantageous effects can be obtained.

As described above, the rotating electrical machine ECU 23 (second control device) can directly receive an electrical power storage unit signal from the battery ECU 37 (first control device) without the need to wait to receive an actuation command signal from the engine ECU 40 (third control device), and can implement temporary measures on the basis of the electrical power storage unit signal. In other words, when some state change about charging/discharging of the lithium-ion storage battery 12 occurs in the battery ECU 37, that information can be rapidly reflected in the actuation of the rotating electrical machine 21. While instantaneous action can be achieved by the rotating electrical machine ECU 23, action with a high degree of certainty can be achieved by the engine ECU 40. Note that the rotating electrical machine ECU 23 performs local computation processes to control the rotating electrical machine 21, whereas the engine ECU 40 performs overall management of the other ECUs. Therefore, the engine ECU 40 enables the rotating electrical machine ECU 23 to take action with a high degree of certainty (also referred to as reliability).

As a result, it is possible to cause the lithium-ion storage battery 12 side and the rotating electrical machine 21 side to cooperate with each other promptly and control the lithium-ion storage battery 12 and the rotating electrical machine 21 properly.

Specific procedures are as follows:

(1) The battery ECU 37 opens the switches 31 and 32 in the event of an abnormality in the battery unit U (in other words, in the event of an abnormality in charging/discharging of the lithium-ion storage battery 12), and transmits, to the rotating electrical machine ECU 23 and the engine ECU 40, an abnormality signal includes abnormality information corresponding to the abnormality;

(2) On the basis of the abnormality signal received from the battery ECU 37, the engine ECU 40 transmits, to the rotating electrical machine ECU 23, a fail-safe signal for performing fail-safe actuation of the rotating electrical machine 21; and (3) The rotating electrical machine ECU 23 starts fail-safe actuation of the rotating electrical machine 21 on the basis of reception of the abnormality signal from the battery ECU 37 or reception of the fail-safe signal from the engine ECU 40, whichever occurs earlier.

In this case, the rotating electrical machine 21 can start fail-safe actuation (output restriction on the rotating electrical machine 21) on the basis of an abnormality signal from the battery ECU 37 without the need to wait to receive a fail-safe signal from the engine ECU 40. Consequently, when an abnormality in charging/discharging occurs in the lithium-ion storage battery 12, a disadvantageous situation where a delay in the initiation of fail-safe actuation of the rotating electrical machine 21 causes an excess current flow through the conduction path between the rotating electrical machine 21 and the lead-acid storage battery 11 can be avoided, and failure due to overcurrent can be prevented.

In the configuration of connecting the rotating electrical machine 21 and the lead-acid storage battery 11 together via the bypass switch 36 in the event of an abnormality in the lithium-ion storage battery 12, overcurrent in the bypass switch 36 can be prevented. In this regard, according to the above configuration, secondary damage such as damage of the bypass switch 36 can be prevented.

The following additional procedures are based on the assumption that an abnormality in the lithium-ion storage battery 12 would be resolved:

(4) After an abnormality occurs in the battery unit U, when the abnormality is resolved, the battery ECU 37 returns the switches 31 and 32 to normal control, and transmits, to the engine ECU 40, an abnormality clear signal includes abnormality information corresponding to the resolution of abnormality;

(5) On the basis of the abnormality clear signal received from the battery ECU 37, the engine ECU 40 transmits, to the rotating electrical machine ECU 23, a fail-safe clear signal for terminating the fail-safe actuation of the rotating electrical machine 21; and (6) On the basis of the fail-safe clear signal received from the engine ECU 40, the rotating electrical machine ECU 23 finishes the fail-safe actuation of the rotating electrical machine 21.

In this case, unlike in the case of starting fail-safe actuation in response to an abnormality, only the engine ECU 40, i.e., the higher-level control device, is authorized to determine whether to finish fail-safe actuation. Therefore, whether to finish fail-safe actuation can be determined more reliably. To be more specific, priority is given to promptness when it comes to starting fail-safe actuation, and priority is given to certainty when it comes to finishing fail-safe actuation.

The lead-acid storage battery 11 and the lithium-ion storage battery 12 are used as dual power sources, and the battery ECU 37 performs charging/discharging control on the lithium-ion storage battery 12. In this case, taking into consideration that the lithium-ion storage battery 12 is a high-density storage battery, the amount of electrical power storage unit and temperature of the lithium-ion storage battery 12 need to be properly managed so that its efficiency and durability can be enhanced. In this regard, according to each of the above configurations, the amount of electrical power storage unit and temperature of the lithium-ion storage battery 12 can be properly managed.

Second Embodiment

The following paragraphs describe the second embodiment, focusing on the differences between the first and second embodiments. The second embodiment employs the same electrical configurations as the first embodiment for the in-vehicle power system and the control system. Computation processes by the respective ECUs described in the present embodiment can be performed along with the computation processes described in the first embodiment above.

The amount of charge/discharge required of the lithium-ion storage battery 12 can change.

For example, the required amount of charge/discharge can change as the amount of power required by the various electrical loads 14 and 15 changes or as the lithium-ion storage battery 12 becomes deteriorated. In this case, it is desirable that the actuation state of the rotating electrical machine 21 be controlled in accordance with the required amount of charge/discharge. In this regard, the present embodiment employs the following configurations:

(1) The battery ECU 37 transmits, to the rotating electrical machine ECU 23 and the engine ECU 40, a request signal (corresponding to an electrical power storage unit signal) includes control information corresponding to the amount of charge/discharge required of the lithium-ion storage battery 12.

(2) On the basis of the request signal received from the battery ECU 37, the engine ECU 40 transmits an actuation command signal for the rotating electrical machine 21 to the rotating electrical machine ECU 23.

(3) The rotating electrical machine ECU 23 controls the actuation of the rotating electrical machine 21 on the basis of the actuation command signal received from the engine ECU 40, and controls the actuation of the rotating electrical machine 21 on the basis of the request signal received from the battery ECU 37.

Figure 7:
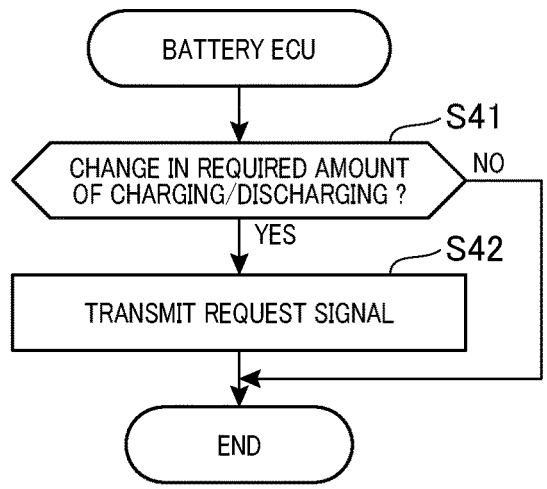
FIG. 7 is a flowchart illustrating a procedure for power request processing by the battery ECU according to the second embodiment.

FIG. 7 is a flowchart illustrating a procedure for power request processing in the battery unit U. This process is repeatedly performed by the battery ECU 37 at predetermined intervals.

In step S41 of FIG. 7, it is determined whether the amount of charge/discharge required of the lithium-ion storage battery 12 has changed. Specifically, it is determined whether the required amount of charge/discharge has changed on the basis of a change in the amount of power required by the various electrical loads 14 and 15 or a deterioration in the lithium-ion storage battery 12. For example, if the amount of power required by the various electrical loads 14 and 15 has increased, it is determined that the amount of charge/discharge required of the lithium-ion storage battery 12 has increased. If the lithium-ion storage battery 12 has deteriorated, it is determined that the amount of charge/discharge required of the lithium-ion storage battery 12 has decreased.

If YES is selected in step S41, the process goes on to step S42. In step S42, a request signal corresponding to the required amount of charge/discharge is transmitted to the rotating electrical machine ECU 23 and the engine ECU 40 using the communication line 41.

Figure 8:
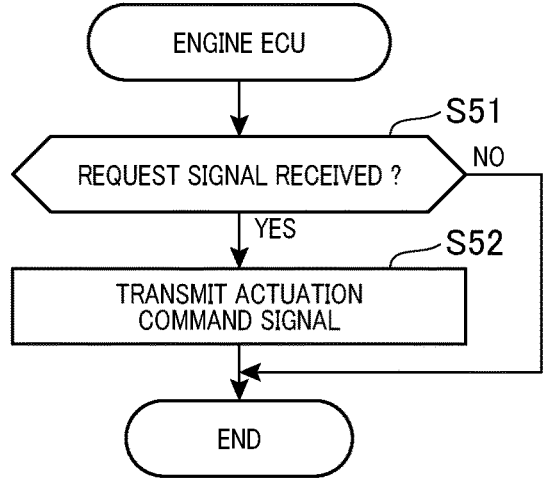
FIG. 8 is a flowchart illustrating a procedure for charge/discharge monitoring by the engine ECU according to the second embodiment.

FIG. 8 is a flowchart illustrating a procedure for charge/discharge monitoring. This process is repeatedly performed by the engine ECU 40 at predetermined intervals.

In step S51 of FIG. 8, it is determined whether a request signal has been received from the battery ECU 37. If a request signal has been received, the process goes on to step S52, and an actuation command signal for the rotating electrical machine 21 is transmitted to the rotating electrical machine ECU 23 using the communication line 41.

Figure 9:
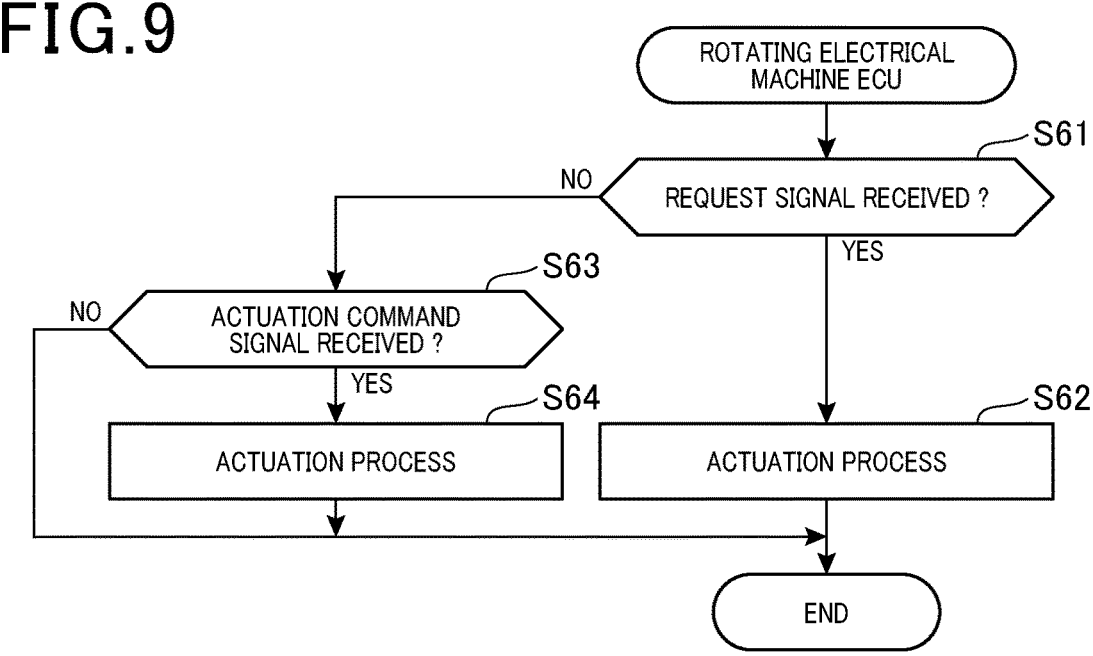
FIG. 9 is a flowchart illustrating a procedure for actuation control by the rotating electrical machine ECU according to the second embodiment.

FIG. 9 is a flowchart illustrating a procedure for actuation control in the rotating electrical machine unit 16. This process is repeatedly performed by the rotating electrical machine ECU 23 at predetermined intervals.

In step S61 of FIG. 9, it is determined whether a request signal has been received from the battery ECU 37. If a request signal has been received, the process goes on to step S62, and the actuation of the rotating electrical machine 21 is controlled through current control in the inverter 22 or field current control.

If a request signal has not been received, the process goes on to step S63, and it is determined whether an actuation command signal has been received from the engine ECU 40. If an actuation command signal has been received, the process goes on to step S64, and the actuation of the rotating electrical machine 21 is controlled through current control in the inverter 22 or field current control.

While both steps S62 and S64 are for performing actuation control on the rotating electrical machine 21 based on changes in the amount of charge/discharge required of the lithium-ion storage battery 12, their processing details are preferably different from each other. For example, the actuation control for the rotating electrical machine 21 in step S62 gives priority to responsiveness to request changes, whereas the actuation control for the rotating electrical machine 21 in step S64 gives priority to certainty about request changes. In consideration of this, different amounts of actuation of the rotating electrical machine 21 are used in steps S62 and S64. In this case, $A1<A2$ is satisfied, where A1 and A2 represent the amounts of actuation (e.g., generated power) of the rotating electrical machine 21 in steps S62 and S64, respectively.

According to the above configuration in the present embodiment, the rotating electrical machine ECU 23 (second control device) can rapidly control the actuation of the rotating electrical machine 21 in response to a request signal from the battery ECU 37 (first control device) without the need to wait to receive an actuation command signal from the engine ECU 40 (third control device). Consequently, when the amount of power required by the various electrical loads 14 and 15 of the power system changes or when the lithium-ion storage battery 12 becomes deteriorated, related requests can be dealt with rapidly.

Priority is desirably given to certainty (reliability) when controlling the actuation of the rotating electrical machine 21 on the basis of an actuation command signal received from the engine ECU 40, whereas priority is desirably given to promptness when controlling the actuation of the rotating electrical machine 21 on the basis of a request signal received from the battery ECU 37. In this regard, the rotating electrical machine ECU 23 uses different amounts of actuation of the rotating electrical machine 21 with respect to the required amount of charge/discharge for controlling the rotating electrical machine 21 on the basis of an actuation command signal and for controlling the rotating electrical machine 21 on the basis of a request signal. Therefore, the actuation of the rotating electrical machine 21 can be appropriately controlled in accordance with the situation of state transition.

Third Embodiment

The following paragraphs describe the third embodiment, focusing on the differences between the first and third embodiments. The third embodiment employs the same electrical configurations as the first embodiment for the in-vehicle power system and the control system. Computation processes by the respective ECUs described in the present embodiment can be performed along with the computation processes described in the first and second embodiments above.

The actuation state or normality/abnormality state of the rotating electrical machine 21 can change, and it is desirable that the open/closed state of the switches 31 and 32, that is, the connected/disconnected state of the rotating electrical machine 21 and the lithium-ion storage battery 12, be controlled accordingly. In this regard, the present embodiment employs the following configurations:

(1) The rotating electrical machine ECU 23 transmits, to the battery ECU 37 and the engine ECU 40, a rotating electrical machine signal includes at least one of control information and abnormality information about the rotating electrical machine 21.

(2) On the basis of the rotating electrical machine signal received from the rotating electrical machine ECU 23, the engine ECU 40 transmits, to the battery ECU 37, an open/close command signal about the opening/closing of the switches 31 and 32.

(3) The battery ECU 37 controls the opening/closing of the switches 31 and 32 on the basis of the open/close command signal received from the engine ECU 40, and controls the opening/closing of the switches 31 and 32 on the basis of the rotating electrical machine signal received from the rotating electrical machine ECU 23.

In this case, the battery ECU 37 can directly receive a rotating electrical machine signal from the rotating electrical machine ECU 23 without the need to wait to receive an open/close command signal from the engine ECU 40, and can implement temporary measures on the basis of the rotating electrical machine signal. In other words, when some change in control information or abnormality information about the rotating electrical machine 21 occurs in the rotating electrical machine ECU 23, that information can be rapidly reflected in the opening/closing of the switches 31 and 32.

Below is a detailed description of configurations for dealing with a possible abnormality in the rotating electrical machine unit 16. In the event of an abnormality in the rotating electrical machine unit 16, the switches 31 and 32 are forcibly opened in order to stop charging/discharging the lithium-ion storage battery 12. However, if the switches 31 and 32 are not forcibly opened immediately after the occurrence of abnormality, failure may occur in the battery unit U, the inverter 22, or the like. For example, a ground fault in the rotating electrical machine 21 or the inverter 22, that is, a short circuit between the power line and the ground line, may cause failure such as element damage due to overcurrent. In this regard, the present embodiment employs the following configurations:

(1) In the event of an abnormality in the rotating electrical machine unit 16, the rotating electrical machine ECU 23 transmits, to the battery ECU 37 and the engine ECU 40, a rotating electrical machine abnormality signal (corresponding to a rotating electrical machine signal) corresponding to the abnormality.

(2) On the basis of the rotating electrical machine abnormality signal received from the rotating electrical machine ECU 23, the engine ECU 40 transmits, to the battery ECU 37, a force-open signal (corresponding to an open/close command signal) for forcibly opening the switches 31 and 32.

(3) The battery ECU 37 forcibly opens the switches 31 and 32 on the basis of reception of the rotating electrical machine abnormality signal from the rotating electrical machine ECU 23 or reception of the force-open signal from the engine ECU 40, whichever occurs earlier.

Figure 10:
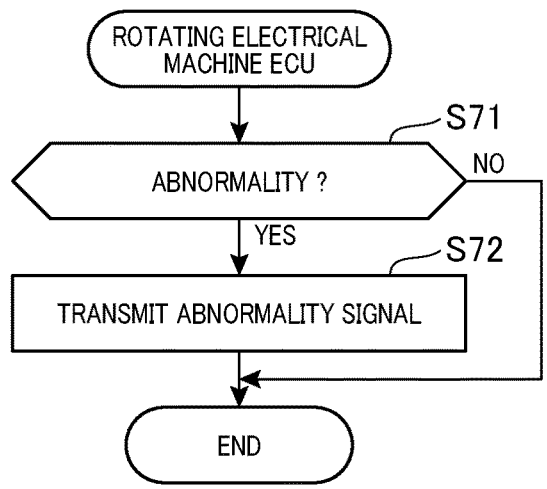
FIG. 10 is a flowchart illustrating a procedure for abnormality determination by the rotating electrical machine ECU according to the third embodiment.

FIG. 10 is a flowchart illustrating a procedure for abnormality determination in the rotating electrical machine unit 16. This process is repeatedly performed by the rotating electrical machine ECU 23 at predetermined intervals.

In step S71 of FIG. 10, it is determined whether there is an abnormality in the rotating electrical machine unit 16. Specifically, it is determined whether an overcurrent is flowing due to an internal short circuit in the rotating electrical machine 21 or the inverter 22 on the basis of the conduction current through the inverter 22 or the like. Here, the rotating electrical machine ECU 23 preferably determines whether there is an overcurrent when the rotating electrical machine 21 is in a state (power generation or non-actuated state) other than the power running state. When the rotating electrical machine 21 is in a state other than the power running state, no current flows from the storage batteries 11 and 12 to the rotating electrical machine 21 side. Therefore, whether there is an overcurrent, i.e., whether an overcurrent is flowing due to a short circuit or the like, can be accurately determined with a relatively low current threshold value.

If there is no abnormality in the rotating electrical machine unit 16, the process is temporarily finished accordingly. If there is any abnormality, the process goes on to step S72. In step S72, a rotating electrical machine abnormality signal is transmitted to the battery ECU 37 and the engine ECU 40 using the communication line 41.

Figure 11:
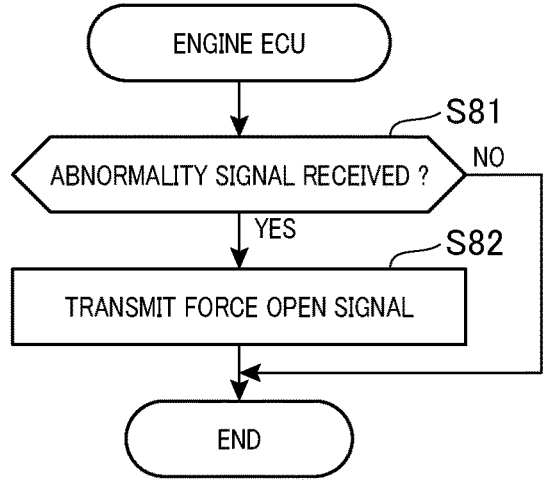
FIG. 11 is a flowchart illustrating a procedure for abnormality monitoring by the engine ECU according to the third embodiment.

FIG. 11 is a flowchart illustrating a procedure for abnormality monitoring. This process is repeatedly performed by the engine ECU 40 at predetermined intervals.

In step S81 of FIG. 11, it is determined whether a rotating electrical machine abnormality signal has been received from the rotating electrical machine ECU 23. If a rotating electrical machine abnormality signal has been received, the process goes on to step S82, and a force-open signal for the switches 31 and 32 is transmitted to the battery ECU 37 using the communication line 41.

Figure 12:
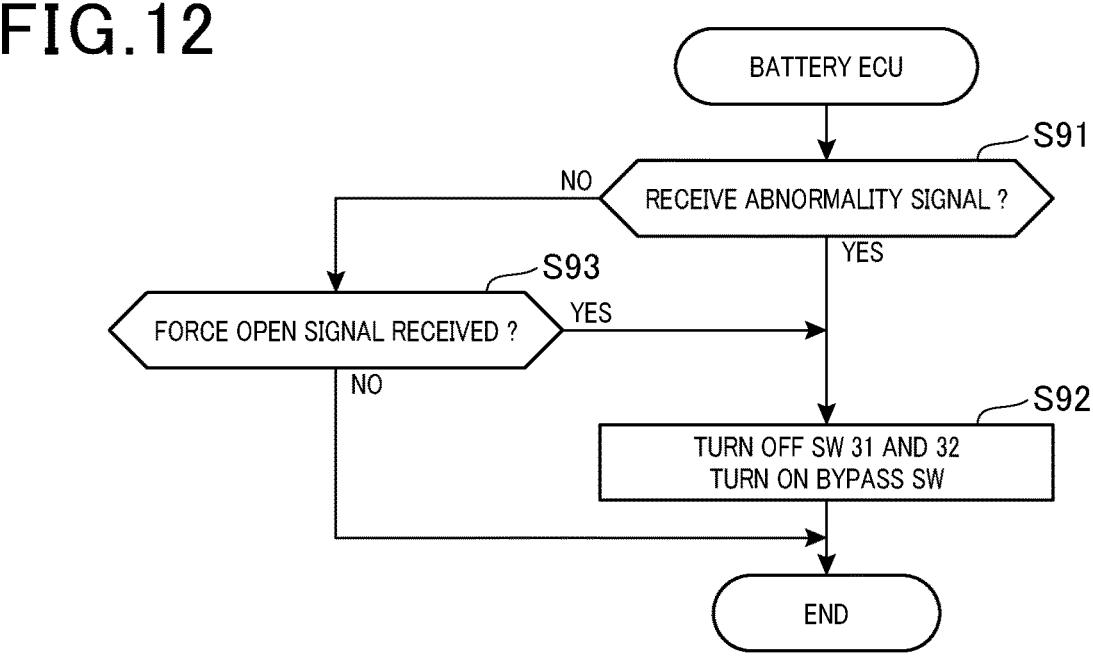
FIG. 12 is a flowchart illustrating a procedure for fail-safe control by the battery ECU according to the third embodiment.

FIG. 12 is a flowchart illustrating a procedure for fail-safe control in the battery unit U. This process is repeatedly performed by the battery ECU 37 at predetermined intervals.

In step S91 of FIG. 12, it is determined whether a rotating electrical machine abnormality signal has been received from the rotating electrical machine ECU 23. If a rotating electrical machine abnormality signal has been received, the process goes on to step S92, and a command for turning off the switches 31 and 32 and a command for turning on the bypass switch 36 are issued as a fail-safe process.

If a rotating electrical machine abnormality signal has not been received, the process goes on to step S93, and it is determined whether a force-open signal has been received from the engine ECU 40. If a force-open signal has been received, the process goes on to step S92, and the fail-safe process is performed. In this case, according to steps S91 to S93, the fail-safe process is performed on the basis of a rotating electrical machine abnormality signal from the rotating electrical machine ECU 23 and a force-open signal from the engine ECU 40, whichever comes earlier.

According to the above configuration in the present embodiment, the switches 31 and 32 of the battery unit U are forcibly opened on the basis of a rotating electrical machine abnormality signal from the rotating electrical machine ECU 23 without the need to wait to receive a force-open signal from the engine ECU 40. Accordingly, the bypass switch 36 is closed. Consequently, when an abnormality in the rotating electrical machine 21 occurs, the flow of overcurrent toward the lithium-ion storage battery 12 due to a delay in the force opening of the switches 31 and 32 can be prevented, and failure due to overcurrent can be prevented.

The rotating electrical machine ECU 23 is configured to perform overcurrent determination when the rotating electrical machine 21 is in a state (power generation or non-actuated state) other than the power running state. In this case, when the rotating electrical machine 21 is in a state other than the power running state, no current flows from the storage batteries 11 and 12 to the rotating electrical machine 21 side. Therefore, overcurrent determination can be performed with a relatively low current threshold value. Thus, measures such as opening the switches can be implemented before any excess current flows into the rotating electrical machine 21 or the inverter 22, so that switch elements can be properly protected.

The third embodiment can also employ the following configurations. According to these configurations, in response to a change in the amount of power generation in the rotating electrical machine unit 16, the opening/closing of the switches 31 and 32 in the battery unit U is controlled in accordance with that change in the amount of power generation. Specific configurations are as follows:

(1) The rotating electrical machine ECU 23 transmits, to the battery ECU 37 and the engine ECU 40, a power generation state signal (corresponding to a rotating electrical machine signal) includes the amount of power generation as control information of the rotating electrical machine 21;

(2) On the basis of the power generation state signal received from the rotating electrical machine ECU 23, the engine ECU 40 transmits, to the battery ECU 37, an open/close command signal about the opening/closing of the switches 31 and 32; and (3) The battery ECU 37 controls the opening/closing of the switches 31 and 32 on the basis of the open/close command signal received from the engine ECU 40, and controls the opening/closing of the switches 31 and 32 on the basis of the power generation state signal received from the rotating electrical machine ECU 23.

In this case, for example, the opening/closing of the switches 31 and 32 is preferably controlled on the basis of reception of an open/close command signal from the engine ECU 40 or reception of a power generation state signal from the rotating electrical machine ECU 23, whichever occurs earlier.

Fourth Embodiment

Figure 13:
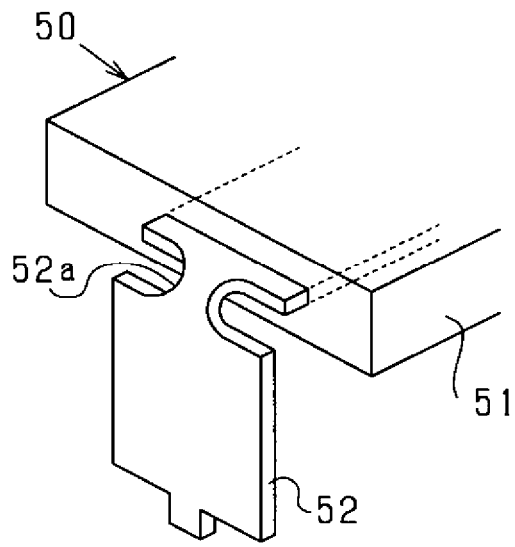
FIG. 13 is a perspective view partially illustrating a switch module according to the fourth embodiment.

The process of the rotating electrical machine ECU 23 according to the fourth embodiment is partly different from that of the third embodiment. Below is a detailed description of overcurrent determination by the rotating electrical machine ECU 23. The present embodiment particularly includes the following configuration as a configuration of each of the switches Sp and Sn of the inverter 22. FIG. 13 is a perspective view partially illustrating a switch module 50 constituting each of the switches Sp and Sn. The switch module 50 has a main body 51 and a lead 52 (bus bar). The main body 52 includes resin-molded semiconductor switching elements and peripheral circuits. The lead 52 is connected to the semiconductor switching elements and the like and protrudes from a side of the main body 51. The lead 52 is mounted, at its distal end, on a substrate or at a mounting position, i.e., a certain site on the substrate, by welding or the like. The lead 52 is provided in part thereof with a narrow portion 52a. Therefore, when an excessive current (overcurrent) flows into the switch module 50 through the lead 52, the narrow portion 52a is fused due to heat generation.

If a closed fault in the upper arm switch Sp and a closed fault in the lower arm switch Sn occur in the same phase of the inverter 22, an overcurrent may flow through each of the switches Sp and Sn due to a short circuit between the power line and the ground line. In this case, when an overcurrent flows through each of the switches Sp and Sn, the narrow portion 52a of the lead 52 in the switch module 50 is fused, and a continuous flow of overcurrent is prevented accordingly.

Note that the rotating electrical machine unit 16 is liable to suffer a short circuit in the rotating electrical machine 21 as well as a short circuit in the inverter 22. For example, a short circuit in any part of the phase windings 24U, 24V, and 24W causes a flow of overcurrent to each of the switches Sp and Sn of the inverter 22.

Focusing on the fact that as soon as the lead 52 is fused by overcurrent, the large current in the conduction path rapidly decreases due to the fusing, the present embodiment forcibly opens the switches 31 and 32 in the current decreased state as a fail-safe process of the battery unit U. In this case, once the switches 31 and 32 are opened, power supply from the lead-acid storage battery 11 and the lithium-ion storage battery 12 to the inverter 22 is stopped. In the present embodiment, the rotating electrical machine ECU 23 determines that an overcurrent has flowed to the inverter 22 on the basis of the results of first determination for determining that the conduction current flowing through the inverter 22 has increased to a predetermined overcurrent threshold value and second determination for determining that the conduction current has decreased after that. The battery ECU 37 opens the switches 31 and 32 on the basis of the result of overcurrent determination in the rotating electrical machine ECU 23.

Figure 14:
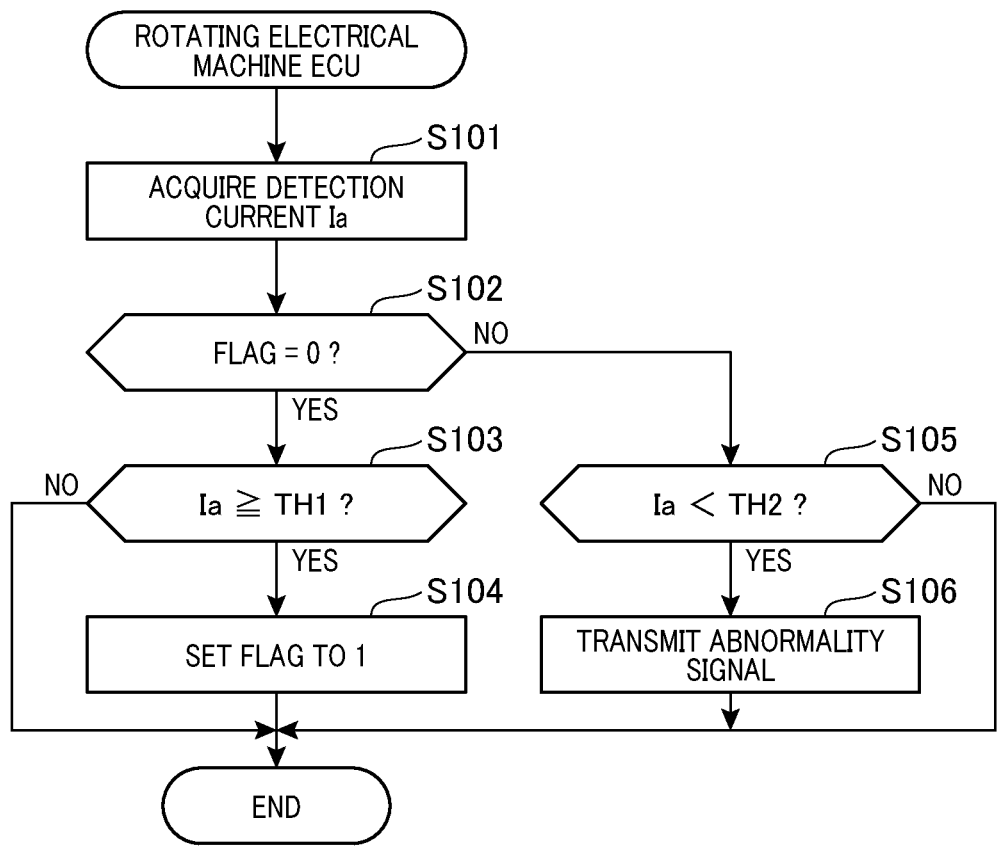
FIG. 14 is a flowchart illustrating a procedure for abnormality determination by the rotating electrical machine ECU according to the fourth embodiment.

FIG. 14 is a flowchart illustrating a procedure for abnormality determination in the rotating electrical machine unit 16. This process is substituted for the above-mentioned process in FIG. 10.

In step S101 of FIG. 14, a detection current Ia detected by the current sensor 27 is acquired.

In the subsequent step S102, it is determined whether a flag indicating the generation of overcurrent in the inverter 22 is zero. If flag=0 is satisfied, the process goes on to step S103, and it is determined whether the detection current Ia is equal to or greater than a predetermined first threshold value TH1. The first threshold value TH1 corresponds to an "overcurrent threshold value", and TH1=400 A is satisfied, for example. If the detection current Ia is less than the first threshold value TH1, the process is finished accordingly. If the detection current Ia is equal to or greater than the first threshold value TH1, the process goes on to step S104, the flag is set to one, and thereafter the process is finished.

After the flag is set to one, NO is selected in step S102, and the process goes on to step S105. In step S105, it is determined whether the detection current Ia is less than a predetermined second threshold value TH2. The second threshold value TH2 is a current value smaller than the first threshold value TH1, and TH2=200 A, for example.

If the detection current Ia is equal to or greater than the second threshold value TH2, the process is finished accordingly. If the detection current Ia is less than the second threshold value TH2, the process goes on to step S106, a rotating electrical machine abnormality signal is transmitted to the battery ECU 37 and the engine ECU 40 using the communication line 41, and thereafter the process is finished.

Note that the abnormality monitoring process by the engine ECU 40 and the fail-safe process by the battery ECU 37 conform to FIGS. 11 and 12 described above and thus are not described herein.

Next, processes for dealing with an overcurrent in the inverter 22 will be described in detail using the timing chart of FIG. 15.

Figure 15:
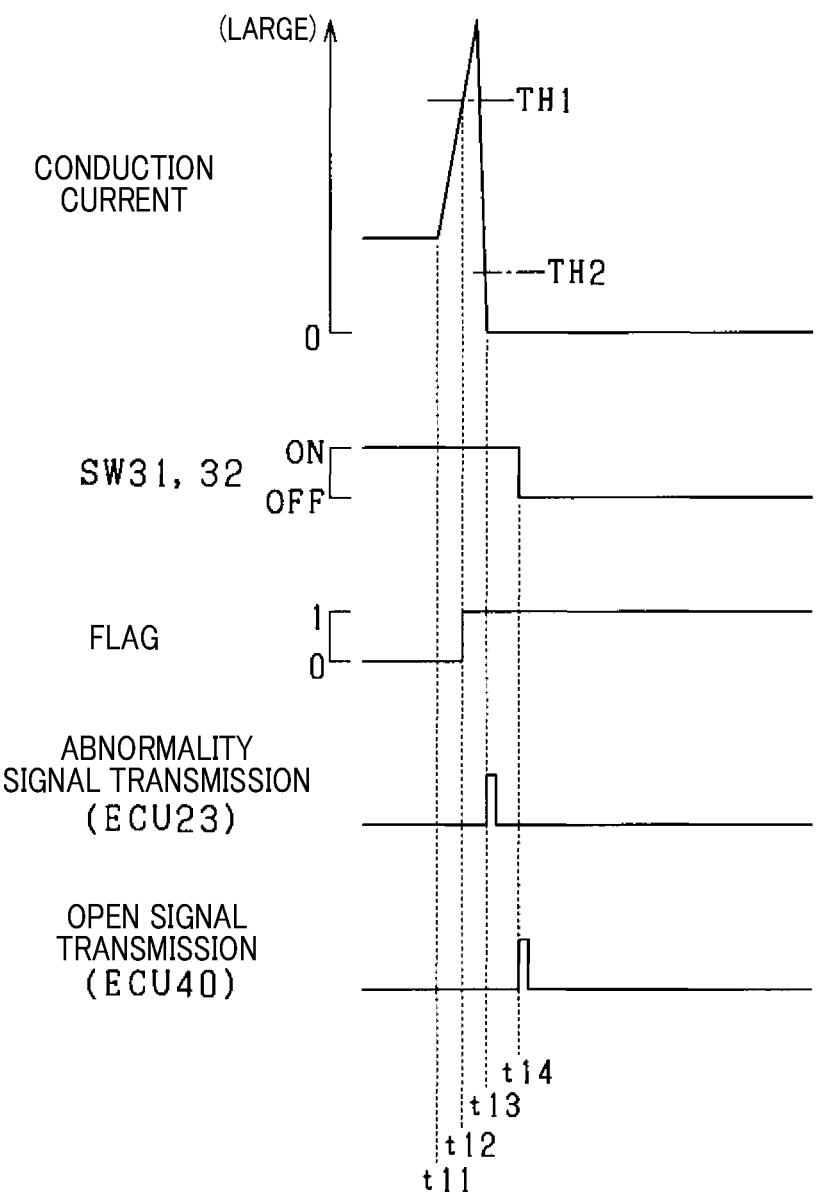
FIG. 15 is a timing chart for explaining in detail processes for dealing with an overcurrent in an inverter according to the fourth embodiment.

In FIG. 15, before timing t11, each of the switches Sp and Sn of the inverter 22 is turned on/off in accordance with actuation requests for the rotating electrical machine 21, and the conduction current that depends on the actuation state of the rotating electrical machine 21 flows through the inverter 22. In short, the rotating electrical machine unit 16 operates normally. In this state, the conduction current through the inverter 22 (detection current Ia provided by the current sensor 27) is less than the first threshold value TH1. Meanwhile, in the battery unit U, the switches 31 and 32 are closed (or either of them is open, depending on the situation).

Once a short circuit occurs in the inverter 22 at timing t11, for example, the conduction current through the inverter 22 rapidly increases and exceeds the first threshold value TH1 at timing t12. Consequently, the flag is set to 1. Meanwhile, an overcurrent flows through each of the switches Sp and Sn, whereby the narrow portion 52a of the lead 52 in the switch module 50 is fused, and the conduction current rapidly decreases accordingly.

After that, the conduction current falls below the second threshold value TH2 at timing t13, whereby a rotating electrical machine abnormality signal is output from the rotating electrical machine ECU 23. At timing t14, the battery ECU 37 of the battery unit U recognizes the generation of overcurrent in the rotating electrical machine unit 16 in response to receiving the rotating electrical machine abnormality signal, and accordingly performs the fail-safe process, that is, forcibly opens the switches 31 and 32.

In this case, the conduction current is kept small at timing t14, so that the switches 31 and 32 can be suitably opened while switch protection is achieved. To be more specific, opening the switches 31 and 32 on the conduction path through which an overcurrent is flowing may cause a surge current in the conduction path, leading to damage of the switches 31 and 32 due to the surge current. In this regard, according to the above configuration, the switches 31 and 32 are opened while the overcurrent is temporarily diminished. Therefore, the surge current associated with the opening of the switches is suppressed, and switch damage due to the surge current can be prevented.

Meanwhile, at timing t14 (or before/after timing t14, depending on the situation), the engine ECU 40 recognizes the generation of overcurrent in response to receiving the rotating electrical machine abnormality signal, and transmits a force-open signal to the battery ECU 37 accordingly. In the configuration of performing a fail-safe process in the battery unit U after waiting for a command from the engine ECU 30 that is a higher-level ECU, the fail-safe process is performed after timing t14. In contrast, according to the present embodiment, the battery ECU 37 performs a fail-safe process on the basis of a rotating electrical machine abnormality signal from the rotating electrical machine ECU 23 without waiting to receive a force-open signal from the engine ECU 40. Therefore, instantaneous measures can be implemented.

The above configuration includes determining that an overcurrent has flowed on the basis of results of the first determination for determining that the inverter conduction current has increased to the first threshold value TH1 and the second determination for determining that the inverter conduction current has decreased after that, and includes opening the switches 31 and 32 on the basis of the result of determination. In this case, the conduction current can be suitably interrupted while the surge current associated with the opening of the switches 31 and 32 is suppressed. As a result, measures to deal with the occurrence of overcurrent can be optimized.

The second determination for determining that the inverter conduction current has decreased after increasing to the first threshold value TH1 includes determining that the conduction current has decreased to the second threshold value TH2 smaller than the first threshold value TH1.

Therefore, when a short-circuit fault occurs in the rotating electrical machine 21 or the inverter 22, the increase in current associated with the occurrence of overcurrent and the decrease in current associated with the blocking of the path can be determined with certainty. Consequently, switch opening measures can be properly implemented.

With regard to the first determination for determining that the inverter conduction current has increased to the first threshold value TH1 and the second determination for determining that the inverter conduction current has decreased after that, the second determination about current decrease may be performed after the inverter conduction current increases to the first threshold value TH1 and a predetermined period of time (e.g., in the range of 0.5 to 1 sec.) elapses thereafter.

As a blocking section that blocks a conduction path in response to an overcurrent flow through at least one of the rotating electrical machine 21 and the inverter 22, a component other than the narrow portion 52a of the lead 52 in the switch module 50 may be used. For example, a fusing section such as a fuse may be provided on the conduction path through the inverter 22. Alternatively, a blocking section (fusing section) may be provided in the rotating electrical machine 21.

Fifth Embodiment

The following paragraphs describe the fifth embodiment, focusing on the differences between each of the above embodiments and the fifth embodiment. Computation processes by the respective ECUs described in the present embodiment can be performed along with the computation processes described in the first and second embodiments above.

Figure 16:
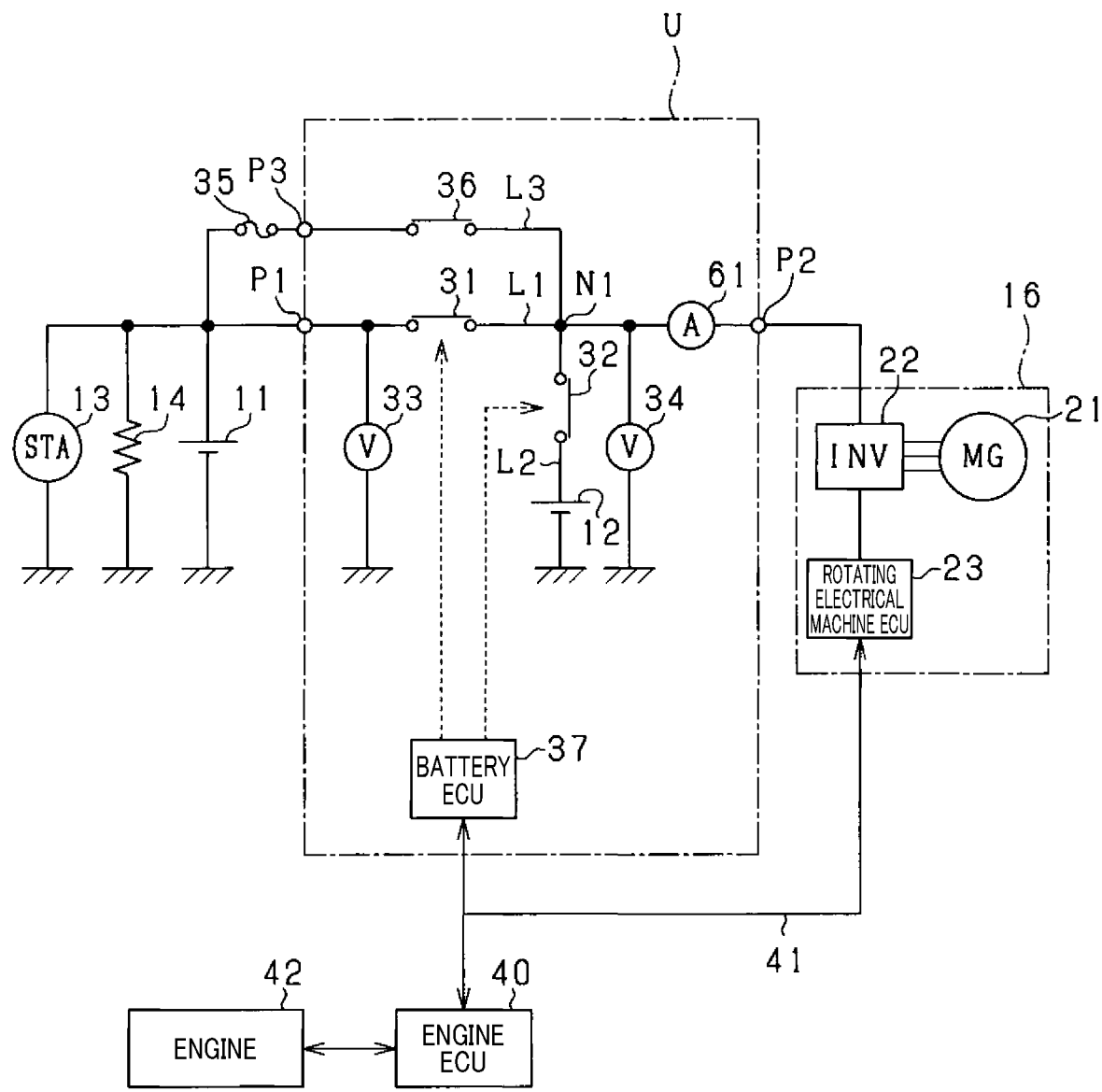
FIG. 16 is an electrical circuit diagram illustrating a power system according to the fifth embodiment.

The configuration of the power system according to the present embodiment, which is illustrated in FIG. 16, is partly different from that in FIG. 1. FIG. 16 is different from FIG. 1 in that a current sensor 61 is provided between the point N1 and the output terminal P2 on the electrical path L1 within the battery unit U. In addition, only the rotating electrical machine unit 16 is connected to the output terminal P2 of the battery unit U, and other electrical loads (instruments) are not connected thereto.

Focusing on the fact that the rotating electrical machine 21 is in any of the power generation, power running, and non-actuated states, the present embodiment controls the state of charging/discharging of each of the storage batteries 11 and 12 in accordance with the state of the rotating electrical machine 21. In this regard, the present embodiment employs the following configurations: Specific configurations are as follows:

(1) The rotating electrical machine ECU 23 transmits, as a rotating electrical machine signal to the battery ECU 37 and the engine ECU 40, a state signal indicating which of a plurality of states includes power generation and power running states the rotating electrical machine 21 is in.

(2) On the basis of the state signal transmitted from the rotating electrical machine ECU 23, the engine ECU 40 transmits, to the battery ECU 37, an open/close command signal controlling opening/closing of the switches.

(3) The battery ECU 37 controls the opening/closing of the switches 31 and 32 on the basis of the open/close command signal transmitted from the engine ECU 40, and controls the opening/closing of the switches 31 and 32 on the basis of the state signal transmitted from the rotating electrical machine ECU 23.

Here, the state signal transmitted from the rotating electrical machine ECU 23 is a mode signal indicating which of the power generation, power running, and neutral (non-actuated) modes the rotating electrical machine 21 is in. Generally, mode signals are bidirectionally communicated between the engine ECU 40 and the rotating electrical machine ECU 23 on a regular basis so that the engine ECU 40 detects the state of the rotating electrical machine 21 on the basis of the mode signals. Especially in the present embodiment, mode signals are also transmitted from the rotating electrical machine ECU 23 to the battery ECU 37 on a regular basis.

More specifically, focusing on the fact that neither of the storage batteries 11 and 12 passes any current through the rotating electrical machine 21 when the rotating electrical machine 21 is in a state (power generation or non-actuated state) other than the power running state, if the rotating electrical machine 21 is drawing a current while the rotating electrical machine 21 is in a state other than the power running state, it is determined that an abnormal current such as overcurrent is flowing.

The rotating electrical machine ECU 23 transmits mode signals to the engine ECU 40 and the battery ECU 37 at predetermined intervals. A mode signal includes a non-power running signal indicating that the rotating electrical machine 21 is in a state other than the power running state. When receiving a non-power running signal from the rotating electrical machine ECU 23, the battery ECU 37 opens the switches 31 and 32 on the basis of the fact that the rotating electrical machine 21 is drawing a current.

Figure 17:
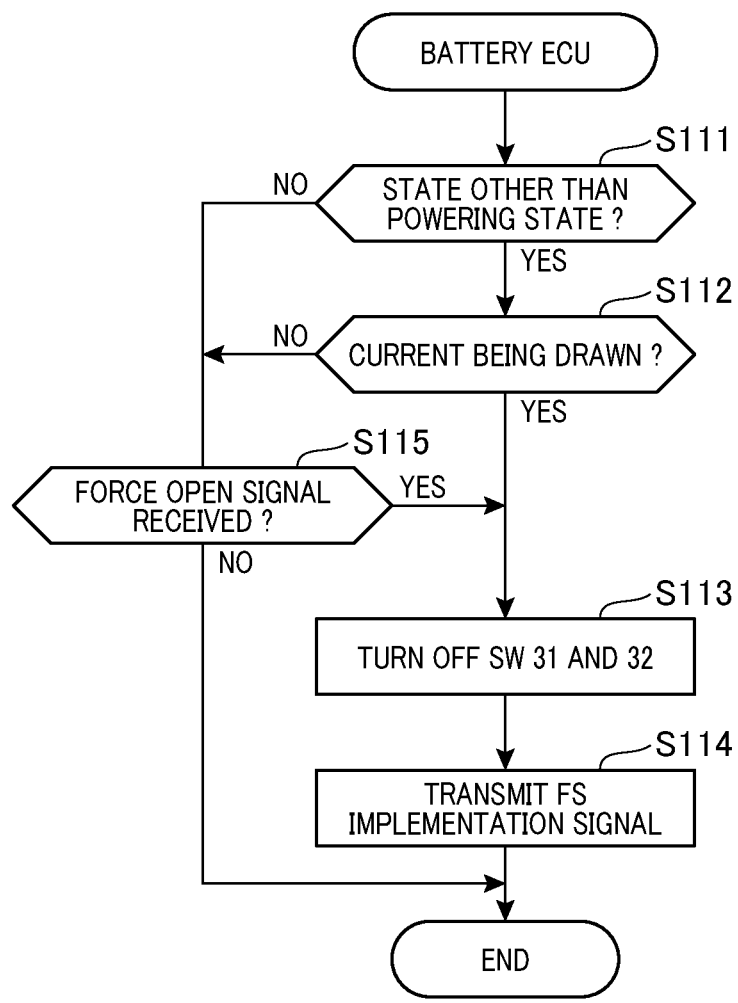
FIG. 17 shows a flowchart illustrating a procedure for fail-safe control by the battery ECU according to the fifth embodiment.

FIG. 17 is a flowchart illustrating a procedure for fail-safe control in the battery unit U. This process is repeatedly performed by the battery ECU 37 at predetermined intervals.

In step S111 of FIG. 17, it is determined whether the rotating electrical machine 21 is now in a state other than the power running state on the basis of a mode signal received from the rotating electrical machine ECU 23. If the rotating electrical machine 21 is in a state other than the power running state, the process goes on to step S112. In step S112, it is determined whether the rotating electrical machine 21 is drawing a current. Specifically, it is determined using a detection signal from the current sensor 61 whether an abnormal current flows from the storage batteries 11 and 12 to the rotating electrical machine unit 16 side, that is, the current flowing through the rotating electrical machine unit 16 side is equal to or greater than a predetermined threshold value. The threshold value for abnormal current determination can be a relatively small current value (in the range of several amperes to several dozen amperes).

If the rotating electrical machine 21 is drawing a current, the process goes on to step S113, and a command for turning off the switches 31 and 32 is issued as a fail-safe process. In the subsequent step S114, an FS implementation signal indicating that the fail-safe process has been performed is transmitted to the engine ECU 40.

If NO is selected in both steps S111 and S112, the process may be finished accordingly. In the present embodiment, however, the fail-safe process is performed on the basis of a command from the engine ECU 40. In step S115 of FIG. 17, it is determined whether a force-open signal (open signal based on an abnormality signal from the rotating electrical machine ECU 23) has been received from the engine ECU 40, and if a force-open signal has been received, the process goes on to step S113, where the fail-safe process is performed.

According to the above configuration, the battery ECU 37 can rapidly perform control in accordance with the state of the rotating electrical machine 21 without the need to receive a signal indicating information on the rotating electrical machine 21 from the engine ECU 40.

In particular, the battery ECU 37 detects that the rotating electrical machine 21 is in a state other than the power running state on the basis of a non-power running signal from the rotating electrical machine ECU 23, determines that an overcurrent is flowing if the rotating electrical machine 21 is drawing a current in this state, and opens the switches 31 and 32. In this case, the battery ECU 37 can rapidly detect the state of overcurrent abnormality, so that switch elements can be properly protected. For example, whether there is an overcurrent can be accurately determined with a relatively low current threshold value, and the fail-safe process can be performed before any excess current flows into the rotating electrical machine 21 or the inverter 22.

Other Embodiments

The above embodiments may be changed in the following manner, for example.

Since the lithium-ion storage battery 12 and the rotating electrical machine 21 exchange power with each other, their voltages and currents have correlated values. In this regard, if the battery ECU 37 and the rotating electrical machine ECU 23 can deliver information on detection voltage and detection current to each other, an improvement in the accuracy and reliability of detection voltage and detection current can be expected. Therefore, either the battery ECU 37 or the rotating electrical machine ECU 23 compares the voltage detected on the conduction path through the lithium-ion storage battery 12 (detection voltage provided by the voltage sensor 33 or 34) with the voltage detected on the conduction path through the rotating electrical machine 21 (detection voltage provided by the voltage sensor 26), and evaluates the reliability of detection information on the basis of the result of comparison.

Figure 18:
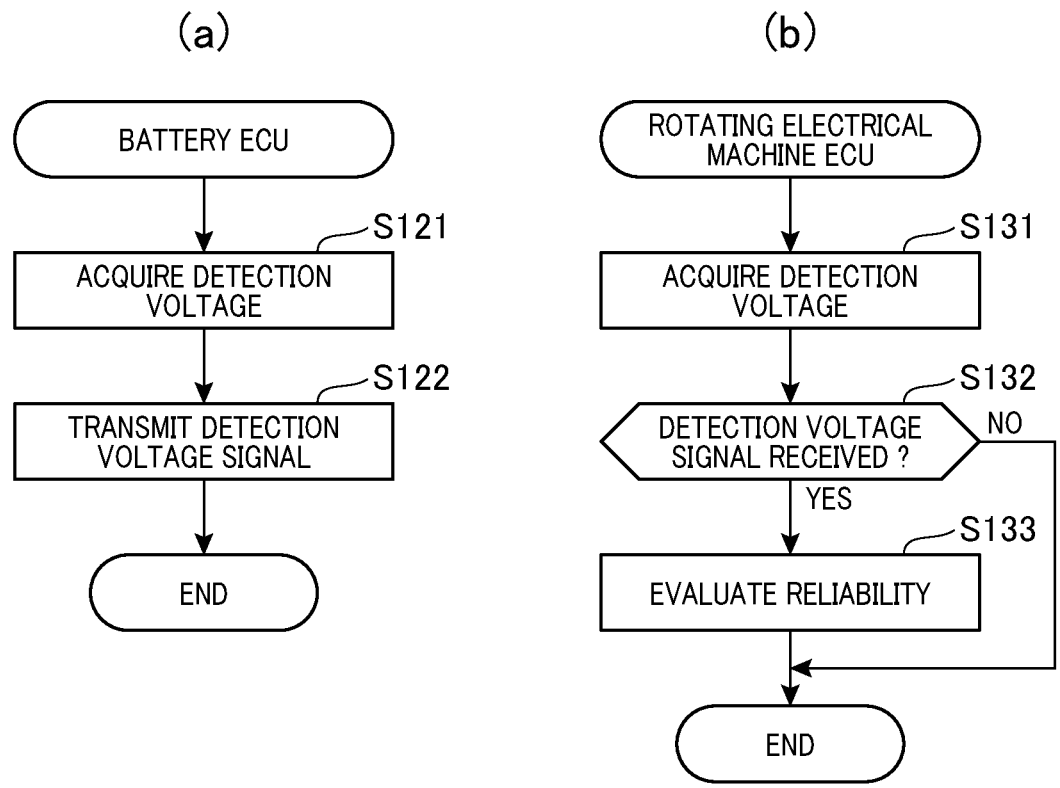
FIG. 18 shows flowcharts illustrating procedures in the battery ECU and the rotating electrical machine ECU according to another example.

More specifically, the computation processes in FIG. 18 are performed. FIG. 18(*a*) illustrates a process performed by the battery ECU 37, and FIG. 18(*b*) illustrates a process performed by the rotating electrical machine ECU 23. These processes are performed by the respective ECUs 37 and 23 at predetermined intervals.

In step S121 of FIG. 18(*a*), the detection voltage provided by the voltage sensor 33 is acquired. In the subsequent step S122, a detection voltage signal corresponding to the acquired voltage is transmitted to the rotating electrical machine ECU 23 via the communication line 41.

In step S131 of FIG. 18(*b*), the detection voltage provided by the voltage sensor 26 is acquired. In the subsequent step S132, it is determined whether a detection voltage signal has been received from the battery ECU 37. If YES is selected in step S132, the process goes on to step S133. In step S133, the detection voltage provided by the voltage sensor 33 is compared with the detection voltage provided by the voltage sensor 26, and the reliability of detection information is evaluated on the basis of the result of comparison. Specifically, the evaluation of the reliability of each voltage sensor is high if the difference between these detection voltages is less than a predetermined value, and the evaluation of the reliability of at least any of the voltage sensors is low if the difference between these detection voltages is equal to or greater than the predetermined value.

Note that the reliability of detection information may be evaluated by the battery ECU 37, not by the rotating electrical machine ECU 23. In this case, a detection voltage signal is transmitted from the rotating electrical machine ECU 23 to the battery ECU 37. Alternatively, the current detected on the conduction path through the lithium-ion storage battery 12 (detection current provided by a current sensor) may be compared with the current detected on the conduction path through the rotating electrical machine 21 (detection current provided by a current sensor), and the reliability of detection information may be evaluated on the basis of the result of comparison.

According to the above configuration, the reliability of detection information, that is, the reliability of voltage sensors or current sensors, can be suitably evaluated using the difference between items of detection information acquired in the ECUs 23 and 37.

Note that the detection voltage (or detection current) in the battery unit U and the detection voltage (or detection current) in the rotating electrical machine unit 16 may be transmitted from the respective ECUs 23 and 37 to the engine ECU 40. In this case, the reliability of detection information is evaluated in the engine ECU 40.

Figure 19:
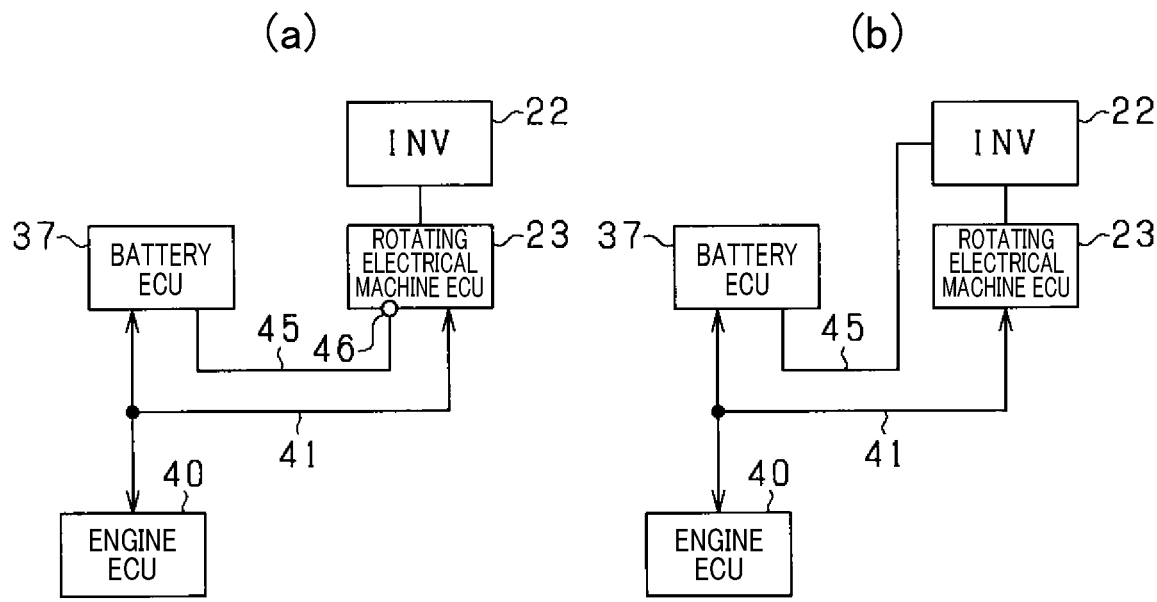
FIG. 19 shows circuit diagrams illustrating other configurations of control systems.

FIG. 19 shows circuit diagrams illustrating other configurations of control systems. In FIG. 19(a), the ECUs 23, 37, and 40 are connected together by the communication line 41, and the battery ECU 37 and the rotating electrical machine ECU 23 are connected together by a hard wire 45. In this case, in particular, the hard wire 45 is connected to an interrupt port 46 of the rotating electrical machine ECU 23. The hard wire 45 is a signal line that transmits a voltage signal from the output port of the output side ECU to the input port of the input side ECU. Note that the communication line 41 may be any communication line that enables signal transmission at least between the ECUs 23 and 37 and the ECU 40.

In this case, in the event of an abnormality in the battery unit U, for example, an abnormality signal is transmitted from the battery ECU 37 to the interrupt port 46 of the rotating electrical machine ECU 23 via the hard wire 45. In this case, in response to the signal being input to the interrupt port 46, a fail-safe process of the rotating electrical machine 21 is performed.

In FIG. 19(b), the ECUs 23, 37, and 40 are connected together by the communication line 41, and the battery ECU 37 and the inverter 22 are connected together by the hard wire 45. In this case, a voltage signal from the output port of the battery ECU 37 is directly transmitted to the inverter 22, and the output from the inverter 22 is adjusted by the voltage signal. For example, in the event of an abnormality in the battery unit U, a voltage signal for abnormality is transmitted from the battery ECU 37 to the inverter 22 via the hard wire 45. Consequently, for example, each switching element of the inverter 22 is turned off.

As illustrated in FIG. 19, the configuration of connecting the battery ECU 37 and the rotating electrical machine unit 16 (rotating electrical machine ECU 23 or inverter 22) together by the hard wire 45 enables signal transmission between the battery ECU 37 and the rotating electrical machine unit 16 (rotating electrical machine ECU 23 or inverter 22) without waiting for a communication period in each ECU. Consequently, information can be transmitted more promptly.

In the configuration of FIG. 1, the electrical load 14, or a constant voltage required load, is connected to the output terminal P1 side of the battery unit U, that is, to the lead-acid storage battery 11 side, and the electrical load 15, or a general load, is connected to the output terminal P2 side, that is, to the rotating electrical machine unit 16 side. However, this configuration may be changed. For example, the electrical load 15 (general load) may be connected to the output terminal P1 side of the battery unit U, and the electrical load 14 (constant voltage required load) may be connected to the output terminal P2 side.

In the above embodiment, the lead-acid storage battery 11 and the lithium-ion storage battery 12 are provided as the first and second electrical power storage units, respectively. However, this configuration may be changed. A high-density storage battery other than the lithium-ion storage battery 12, e.g., a nickel-hydrogen battery, may be used as the second electrical power storage unit. Alternatively, a capacitor can be used as at least one of the electrical power storage units.

The power system according to the present disclosure can be used for applications other than vehicular applications.

The present disclosure has been described with reference to examples, but it is to be understood that the present disclosure is not limited to the examples and structures. The present disclosure covers various modifications and equivalent variations. In addition to various combinations and forms, other combinations and forms includes one or more/less elements thereof are also within the spirit and scope of the present disclosure.

What is claimed is:

1. A control system that is applied to a power system, the power system comprising:
    a rotating electrical machine;
    a first electrical power storage unit and a second electrical power storage unit connected in parallel with the rotating electrical machine; and
    a switch provided closer to the second electrical power storage unit on an electrical path between the first electrical power storage unit and the second electrical power storage unit than a point of connection with the rotating electrical machine is,
  the control system includes:
    a first control device that controls charging/discharging of the second electrical power storage unit by opening/closing the switch; and
    a second control device that controls actuation of power generation and power running of the rotating electrical machine, the first control device and the second control device being able to transmit and receive signals to and from a third control device using a signal transmission section, the third control device being configured to perform an overall management to the control devices and transmit a command signal to the second control device in response to a reception signal from the first control device, wherein
  the first control device transmits, to the second control device and the third control device, an electrical power storage unit signal includes at least one of control information and abnormality information about the charging/discharging, and
  the second control device includes a function of controlling actuation of the rotating electrical machine on the basis of an actuation command signal about actuation of the rotating electrical machine transmitted from the third control device in response to the electrical power storage unit signal, and a function of controlling actuation of the rotating electrical machine on the basis of the electrical power storage unit signal transmitted from the first control device.

2. The control system according to claim 1, wherein
  in the event of an abnormality in the charging/discharging, the first control device opens the switch, and transmits, as the electrical power storage unit signal to the second control device and the third control device, an abnormality signal includes the abnormality information corresponding to the abnormality, and
  the second control device starts fail-safe actuation of the rotating electrical machine on the basis of reception of the abnormality signal from the first control device or reception of a fail-safe signal for performing fail-safe actuation of the rotating electrical machine transmitted as the actuation command signal from the third control device in response to the abnormality signal, whichever occurs earlier.

3. The control system according to claim 2, wherein the power system includes:
a first switch provided closer to the first electrical power storage unit on the electrical path between the first electrical power storage unit and the second electrical power storage unit than the point of connection with the rotating electrical machine is;
a second switch provided in the second electrical power storage unit side on the electrical path; and
a normally-closed bypass switch provided on a bypass for bypassing the first switch, and
in the event of an abnormality in the charging/discharging, the first control device opens the first switch and the second switch, closes the bypass switch, and transmits the abnormality signal to the second control device and the third control device.

4. The control system according to claim 2, wherein an abnormality in the charging/discharging occurs, when the abnormality is resolved, the first control device returns the switch to normal control, and transmits, as the electrical power storage unit signal to the third control device, an abnormality clear signal includes the abnormality information corresponding to resolution of abnormality, and
the second control device finishes the fail-safe actuation on the basis of a fail-safe clear signal for terminating the fail-safe actuation of the rotating electrical machine transmitted as the actuation command signal from the third control device in response to the abnormality clear signal.

5. The control system according to claim 1, wherein the first control device transmits, as the electrical power storage unit signal to the second control device and the third control device, a request signal includes the control information corresponding to an amount of charge/discharge required of the second electrical power storage unit, and
the second control device includes a function of controlling actuation of the rotating electrical machine on the basis of the actuation command signal transmitted from the third control device in response to the request signal, and a function of controlling actuation of the rotating electrical machine on the basis of the request signal transmitted from the first control device.

6. The control system according to claim 5, wherein the second control device uses different amounts of actuation of the rotating electrical machine with respect to the required amount of charge/discharge for controlling actuation of the rotating electrical machine on the basis of the actuation command signal received from the third control device and for controlling actuation of the rotating electrical machine on the basis of the request signal received from the first control device.

7. The control system according to claim 1, wherein the third control device transmits a command signal to the first control device in response to a reception signal from the second control device,
the second control device transmits, to the first control device and the third control device, a rotating electrical machine signal includes at least one of control information and abnormality information about the rotating electrical machine, and
the first control device includes a function of controlling opening/closing of the switch on the basis of an open/close command signal about opening/closing of the switch transmitted from the third control device in response to the rotating electrical machine signal, and a function of controlling opening/closing of the switch on the basis of the rotating electrical machine signal transmitted from the second control device.

8. The control system according to claim 7, wherein in the event of an abnormality in the rotating electrical machine, the second control device transmits, as the rotating electrical machine signal to the first control device and the third control device, a rotating electrical machine abnormality signal corresponding to the abnormality, and
the first control device forcibly opens the switch on the basis of reception of the rotating electrical machine abnormality signal from the second control device or reception of a force-open signal for forcibly opening the switch transmitted as the open/close command signal from the third control device in response to the rotating electrical machine abnormality signal, whichever occurs earlier.

9. The control system according to claim 8, wherein the second control device determines, as the abnormality in the rotating electrical machine, that an overcurrent flows through at least one of the rotating electrical machine and a switching circuit section that passes a current through each phase of the rotating electrical machine, and determines whether there is the overcurrent when the rotating electrical machine is in a state other than a power running state.

10. The control system according to claim 8, wherein the control system is applied to a power system provided with a blocking section that blocks a conduction path in response to an overcurrent flow through at least one of the rotating electrical machine and a switching circuit section that passes a current through each phase of the rotating electrical machine, and
the second control device determines that the overcurrent has flowed on the basis of results of first determination for determining that a conduction current flowing through the switching circuit section has increased to a predetermined overcurrent threshold value and second determination for determining that the conduction current has decreased after that, and transmits the rotating electrical machine abnormality signal to the first control device and the third control device on the basis of the determination.

11. The control system according to claim 10, wherein the second control device determines, as the second determination, that the conduction current has decreased to a second threshold value smaller than the overcurrent threshold value after increasing to the overcurrent threshold value.

12. The control system according to claim 7, wherein the second control device transmits, as the rotating electrical machine signal to the first control device and the third control device, a state signal indicating which of a plurality of states includes power generation and power running states the rotating electrical machine is in, and
the first control device includes a function of controlling opening/closing of the switch on the basis of an open/ close command signal about opening/closing of the switch transmitted from the third control device in response to the state signal, and a function of controlling opening/closing of the switch on the basis of the state signal transmitted from the second control device.

13. The control system according to claim 12, wherein
the second control device transmits, as the state signal to the first control device, a non-power running signal indicating that the rotating electrical machine is in a state other than the power running state, and
when receiving the non-power running signal from the second control device, the first control device opens the switch on the basis of the fact that the rotating electrical machine is drawing a current.

14. The control system according to claim 1, wherein
the first control device acquires detection information of voltage or current detected on a conduction path through the second electrical power storage unit,
the second control device acquires detection information of voltage or current detected on a conduction path through the rotating electrical machine, and
one of the first control device and the second control device receives the detection information from the other control device via the signal transmission section, and evaluates reliability of the detection information on the basis of the detection information in each control device.

15. The control system according to claim 1, wherein
the first electrical power storage unit is a lead-acid storage battery, and
the second electrical power storage unit is a high-density storage battery having a higher output density and a higher energy density than the lead-acid storage battery.

16. The control system according to claim 1, wherein
the signal transmission section that enables signal transmission between the first and second control devices and the third control device is a communication line that establishes a communication network, and
the signal transmission section that enables signal transmission between the first control device and the second control device is a hard wire that transmits a voltage signal from an output port of an output side control device to an input port of an input side control device.

17. A control system that is applied to a power system, the power system comprising:
a rotating electrical machine;
a first electrical power storage unit and a second electrical power storage unit connected in parallel with the rotating electrical machine; and
a switch provided closer to the second electrical power storage unit on an electrical path between the first electrical power storage unit and the second electrical power storage unit than a point of connection with the rotating electrical machine is,
the control system includes:
a first control device that controls charging/discharging of the second electrical power storage unit by opening/closing the switch; and
a second control device that controls actuation of power generation and power running of the rotating electrical machine, the first control device and the second control device being able to transmit and receive signals to and from a third control device using a signal transmission section, the third control device being configured to perform an overall management to the control devices and transmit a command signal to the first control device in response to a reception signal from the second control device, wherein
the second control device transmits, to the first control device and the third control device, a rotating electrical machine signal includes at least one of control information and abnormality information about the rotating electrical machine, and
the first control device includes a function of controlling opening/closing of the switch on the basis of an open/close command signal about opening/closing of the switch transmitted from the third control device in response to the rotating electrical machine signal, and a function of controlling opening/closing of the switch on the basis of the rotating electrical machine signal transmitted from the second control device.

18. A control system that is applied to a power system, the power system comprising:
a rotating electrical machine;
a first electrical power storage unit and a second electrical power storage unit connected in parallel with the rotating electrical machine; and
a switch provided closer to the second electrical power storage unit on an electrical path between the first electrical power storage unit and the second electrical power storage unit than a point of connection with the rotating electrical machine is,
the control system includes:
a first control device that controls charging/discharging of the second electrical power storage unit by opening/closing the switch;
a second control device that controls actuation of power generation and power running of the rotating electrical machine; and
a third control device that performs an overall management to the first control device and the second control device,
the first control device, the second control device, and the third control device being able to transmit signals to each other using a signal transmission section, wherein
the first control device transmits, to the second control device and the third control device, an electrical power storage unit signal includes at least one of control information and abnormality information about the charging/discharging,
the third control device transmits, to the second control device, an actuation command signal about actuation of the rotating electrical machine on the basis of the electrical power storage unit signal received from the first control device, and
the second control device includes a function of controlling actuation of the rotating electrical machine on the basis of the actuation command signal received from the third control device, and a function of controlling actuation of the rotating electrical machine on the basis of the electrical power storage unit signal received from the first control device.

19. A control system that is applied to a power system, the power system comprising:
a rotating electrical machine;
a first electrical power storage unit and a second electrical power storage unit connected in parallel with the rotating electrical machine; and
a switch provided closer to the second electrical power storage unit on an electrical path between the first electrical power storage unit and the second electrical power storage unit than a point of connection with the rotating electrical machine is, the control system includes:

a first control device that controls charging/discharging of the second electrical power storage unit by opening/closing the switch;

a second control device that controls actuation of power generation and power running of the rotating electrical machine; and a third control device that performs an overall management to the first control device and the second control device, the first control device, the second control device, and the third control device being able to transmit signals to each other using a signal transmission section, wherein the second control device transmits, to the first control device and the third control device, a rotating electrical machine signal includes at least one of control information and abnormality information about the rotating electrical machine, the third control device transmits, to the first control device, an open/close command signal about opening/closing of the switch on the basis of the rotating electrical machine signal received from the second control device, and the first control device includes a function of controlling opening/closing of the switch on the basis of the open/close command signal received from the third control device, and a function of controlling opening/closing of the switch on the basis of the rotating electrical machine signal received from the second control device.

* * * * *